(12) United States Patent
Ueno

(10) Patent No.: US 11,044,406 B2
(45) Date of Patent: Jun. 22, 2021

(54) ELECTRONIC APPARATUS CAPABLE OF A NOTIFYING OPERATION DURING COUNTDOWN IN SELF-TIMER SHOOTING AND CONTROL METHOD THEREOF

(71) Applicant: CANON KABUSHIKI KAISHA, Tokyo (JP)

(72) Inventor: Daiyu Ueno, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/680,879

(22) Filed: Nov. 12, 2019

(65) Prior Publication Data
US 2020/0162677 A1  May 21, 2020

(30) Foreign Application Priority Data

Nov. 15, 2018  (JP) .............................. JP2018-215002

(51) Int. Cl.
*H04N 5/232* (2006.01)

(52) U.S. Cl.
CPC ... *H04N 5/232939* (2018.08); *H04N 5/23245* (2013.01)

(58) Field of Classification Search
CPC ......... H04N 5/232939; H04N 5/23245; H04N 1/2133; H04N 5/232933; H04N 5/225;
(Continued)

(56) References Cited

U.S. PATENT DOCUMENTS

| 4,918,538 A | 4/1990 | Saito et al. |
| 5,097,285 A | 3/1992 | Wakabayashi et al. |

(Continued)

FOREIGN PATENT DOCUMENTS

| EP | 0529612 B1 | 12/1996 |
| JP | 2004-282399 A | 10/2004 |

(Continued)

OTHER PUBLICATIONS

The above foreign document was cited in a British Search Report dated Apr. 16, 2020, which is inclosed, that issued in the corresponding British Patent Application No. 1916487.0.

(Continued)

*Primary Examiner* — Padma Haliyur
(74) *Attorney, Agent, or Firm* — Cowan, Liebowitz & Latman, P.C.

(57) ABSTRACT

An electronic apparatus includes: a control unit configured to control so that counting of a self-timer is started responding to a shooting instruction of a still image, and shooting of the still image is performed responding to expiration of the self-timer, and to control so that counting of a self-timer is started responding to a shooting instruction of a moving image, and recording of the moving image is started responding to expiration of the self-timer; and a display control unit configured to control so that a first item for countdown is displayed during the counting of the self-timer responding to the shooting instruction of the still image, and to control so that a second item for countdown is displayed during the counting of the self-timer responding to the shooting instruction of the moving image.

26 Claims, 10 Drawing Sheets

(58) Field of Classification Search
CPC .............. G02F 1/136213; H04M 1/22; H04M 2250/16
See application file for complete search history.

(56) References Cited

U.S. PATENT DOCUMENTS

| | | | |
|---|---|---|---|
| 5,298,936 A | | 3/1994 | Akitake et al. |
| 6,853,403 B1 | | 2/2005 | Inoue et al. |
| 8,855,481 B2 * | 10/2014 | Choi ...................... G03B 17/40 396/264 |
| 9,288,396 B2 * | 3/2016 | Harris ................ H04N 5/23216 |
| 9,952,754 B2 * | 4/2018 | Noda ..................... G03B 17/40 |
| 2003/0193576 A1 | 10/2003 | Fujii |
| 2013/0111410 A1 | 5/2013 | Okada et al. |
| 2013/0278808 A1 | 10/2013 | Tokairin et al. |
| 2016/0261788 A1 | 9/2016 | Mizukami et al. |
| 2017/0180646 A1* | 6/2017 | Kim .................. H04N 5/23218 |

FOREIGN PATENT DOCUMENTS

| | | | |
|---|---|---|---|
| JP | 2015-040972 A | 3/2015 |
| RU | 2009140825 A | 5/2011 |
| WO | 2012/018510 A2 | 2/2012 |
| WO | 2015/183421 A1 | 12/2015 |

OTHER PUBLICATIONS

The above patent documents were cited in a Jul. 24, 2020 Russian Search Report, which is enclosed with an English Translation, that issued in Russian Patent Application No. 2019136274.

* cited by examiner

ELECTRONIC APPARATUS CAPABLE OF A NOTIFYING OPERATION DURING COUNTDOWN IN SELF-TIMER SHOOTING AND CONTROL METHOD THEREOF

BACKGROUND OF THE INVENTION

Field of the Invention

The present invention relates to an electronic apparatus and a control method thereof, and more particularly to a technique to notify operation during countdown in self-timer shooting.

Description of the Related Art

A digital camera, a portable telephone terminal with camera functions and the like, which perform shooting using a self-timer, are known.

Japanese Patent Application Publication No. 2004-282399 proposes the following for self-timer shooting by a camera disposed on the rear face side of a portable telephone. When start of the self-timer shooting is instructed by a key operation, the LED starts to blink. Then three seconds before shooting, the LED starts blinking faster to notify the object person that the shooting will soon be performed. At the same time, three seconds before shooting, a sub-display unit, disposed on the rear face side of the portable telephone, displays countdown, so that the object person knows how many seconds remain until actual shooting is performed.

Japanese Patent Application Publication No. 2015-40972 proposes that in the case of self-timer shooting in a dark place operation mode, which is not intended to capture an image of an individual, the operation of the self-timer is not notified by light emission so as to decrease the negative influence on surroundings.

A conventional problem is that the user cannot easily recognize whether a still image shooting or a moving image shooting is going to be performed during countdown of self-timer shooting. Therefore in some cases, the user may spend time during countdown of self-timer shooting without understanding which, still image shooting or moving image shooting, will be performed. For example, when a user instructs self-timer shooting with an intention to start shooting of a moving image, the user may instruct shooting of a still image in error, and spend time during countdown oblivious to their error. In this case, the user notices the error of shooting a still image, instead of shooting the moving image, only when the actual shooting is performed after the countdown of the self-timer. This means that the time for countdown of the self-timer is wasted, and it takes time to retry the operation and perform the intended shooting. This problem is not considered in Japanese Patent Application Publication No. 2004-282399 and Japanese Patent Application Publication No. 2015-40972.

SUMMARY OF THE INVENTION

The invention provides an electronic apparatus which can more easily recognize the type of shooting that is going to be performed during countdown of the self-timer shooting, and a control method, and a program and a storage medium for the electronic apparatus.

Aspects of the present invention are provided according to the independent claims. An electronic apparatus according to the present invention includes at least one memory and at least one processor which function as: a control unit configured to control so that counting of a self-timer is started responding to a shooting instruction of a still image, and shooting of the still image is performed responding to expiration of the self-timer, and to control so that counting of a self-timer is started responding to a shooting instruction of a moving image, and recording of the moving image is started responding to expiration of the self-timer; and a display control unit configured to control so that an item for countdown of self-timer shooting of the still image, which is not displayed before the counting of the self-timer responding to the shooting instruction of the still image, is displayed during the counting, and to control so that an item for countdown of self-timer shooting of a moving image, which is an item in a display format that is different from that of the item for countdown of the self-timer shooting of the still image and is not displayed before the counting of the self-timer responding to the shooting instruction of the moving image, is displayed during the counting.

Further features of the present invention will become apparent from the following description of exemplary embodiments with reference to the attached drawings.

DESCRIPTION OF THE EMBODIMENTS

Embodiments of the present invention will be described with reference to the drawings.

Figure 1A:
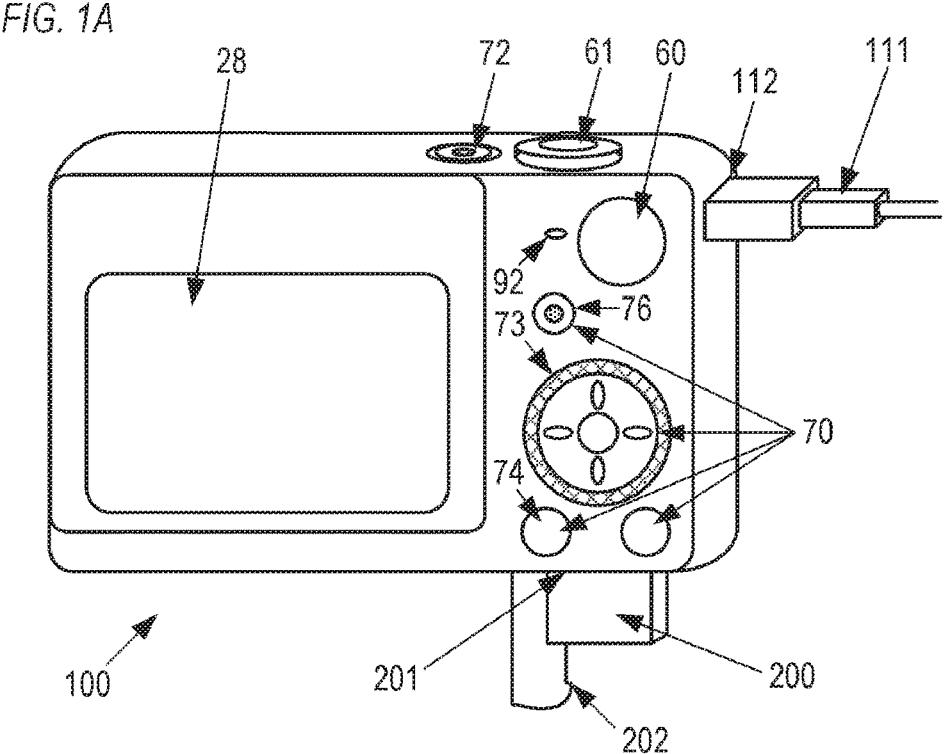
FIGS. 1A and 1B are external views of a digital camera.
Figure 1B:
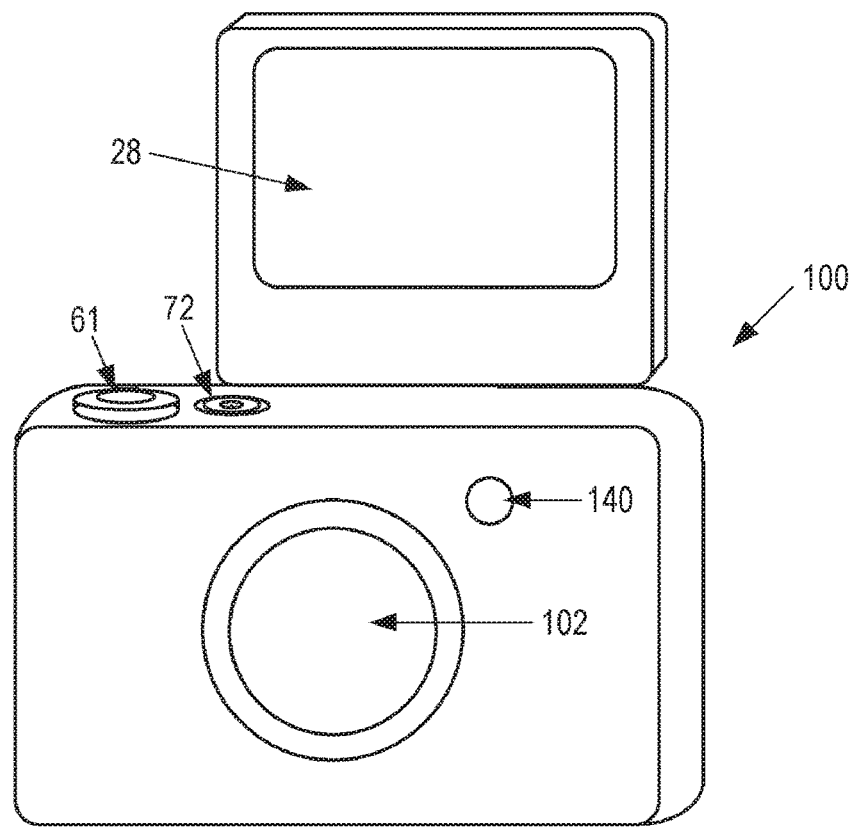

FIGS. 1A and 1B are external views of a digital camera (which is an electronic apparatus and a display control apparatus as well) as an example of an apparatus to which the present invention can be applied. FIG. 1A is a perspective rear view of a digital camera 100, and FIG. 1B is a perspective front view of the digital camera 100. A display unit 28 is a display unit to display an image and various information. A shutter button 61 is an operation member to instruct shooting. A shooting mode dial 60 is an operation member (switching member) to switch a mode to one of a plurality of shooting modes. A power switch 72 is a push button to switch power ON/OFF. A connector 112 is a connector between a connection cable 111 and the digital camera 100, to connect the digital camera 100 with such an external apparatus as a personal computer and a printer. An operation unit 70 is an operation unit constituted of various operation members, such as switches, buttons and a touch panel, to receive various operation instructions from the user. A four-way key 73 is a part of the operation unit 70, and is a direction indication member which can be pushed in one of up, down, left and right directions (up key, down key, left key or right key can be pushed). A reproduction button 74 is a part of the operation unit 70, and is a push button to enter the reproduction mode. If the reproduction button 74 is pushed in the power OFF state, the digital camera 100 starts up in the reproduction mode, and if the reproduction button 74 is pressed in any one of the shooting modes, the reproduction mode starts. A moving image button 76 is a part of the operation unit 70, and is a push button to instruct start of the moving image shooting. A recording medium 200 is such a recording medium as a memory card and a hard disk. A recording medium slot 201 is a slot to store the recording medium 200. The recording medium 200, stored in the recording medium slot 201, can communicate with the digital camera 100. Thereby images can be recorded to the recording medium 200 or images recorded in the recording medium 200 are reproduced. A cover 203 is a cover of the recording medium slot 201. FIG. 1A shows a state where the cover 202 is opened and a part of the recording medium 200 is exposed from the slot 201. A light source 140 is a light-emitting diode (LED) or the like, and notifies the operation state of the digital camera 100 (e.g. during countdown of the self-timer, start of shooting) to an object person who exists in front of the camera, using a predetermined pattern of light emission/non-emission. The light source 140 is disposed on the front face (object side, imaging surface side) of the camera, so as to be visually recognized from the object side. A speaker 92 notifies the operation state of the digital camera 100 (e.g. during countdown of the self-timer, start of shooting) to an object person by sounding a buzzer or the like. A display unit 28 is disposed in a vari-angle monitor unit, of which position can be changed with respect to the main body of the digital camera 100. The vari-angle monitor unit is connected to the digital camera 100 via a connecting unit (not illustrated). The vari-angle monitor unit can turn any one of a plurality of positions, including a standard position (position in FIG. 1A) where the display surface of the display unit 28 faces the rear surface side of the camera, and a counter position (position in FIG. 1B) where the display surface of the display unit 28 faces the object side (shooting direction side).

Figure 2:
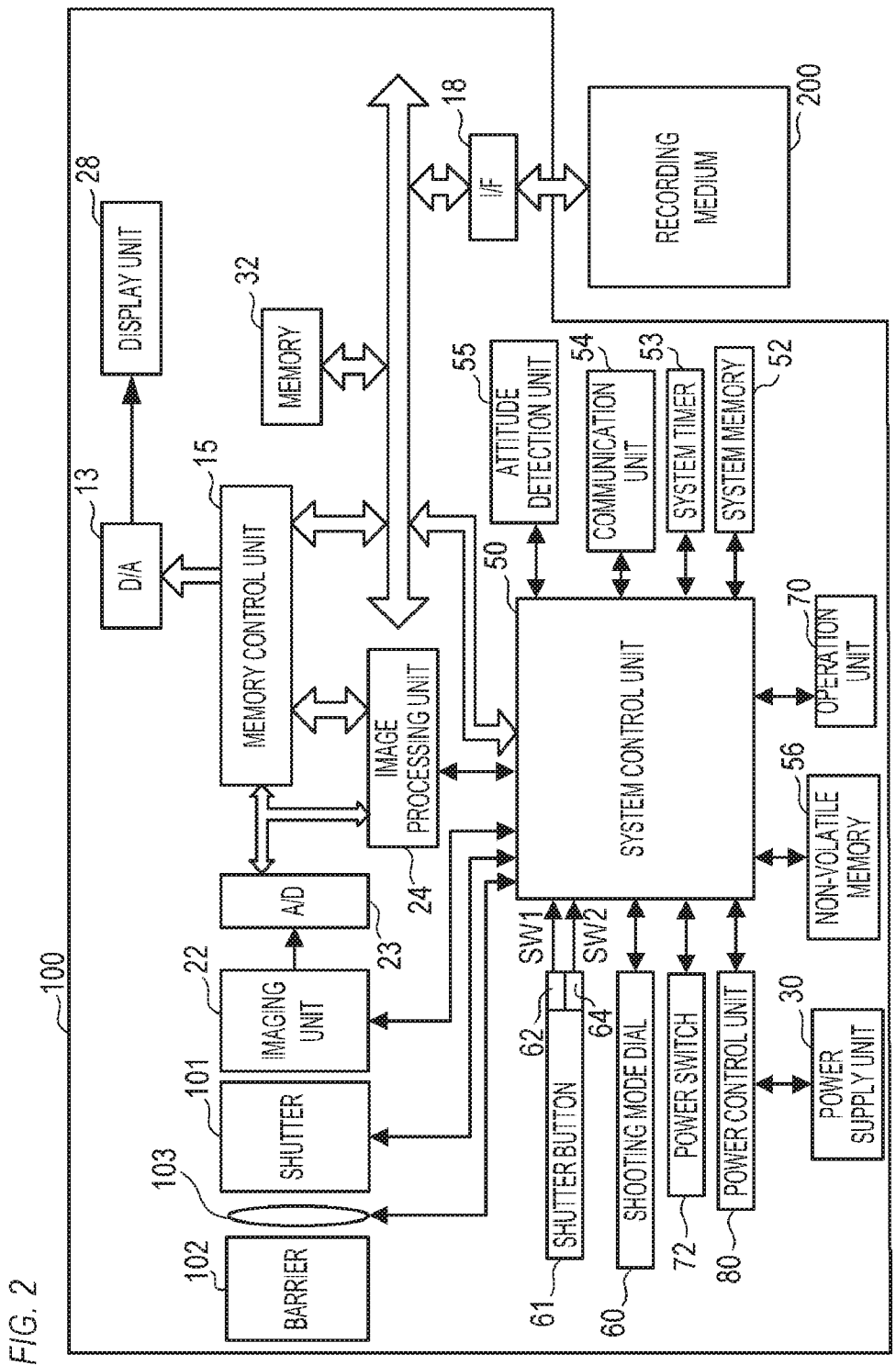
FIG. 2 is a block diagram depicting the digital camera.

FIG. 2 is a block diagram depicting a configuration example of the digital camera 100. In FIG. 2, an image capturing lens 103 is a lens group that includes a zoom lens and a focus lens. A shutter 101 is a shutter that includes an aperture function. An imaging unit 22 is an image pickup element constituted of a CCD, CMOS or the like, which converts an optical image into an electric signal. An A/D convertor 23 converts an analog signal into a digital signal. The A/D convertor 23 is used to convert an analog signal outputted from the imaging unit 22 into a digital signal. A barrier 102 covers an imaging system that includes the image capturing lens 103 of the digital camera 100, so as to prevent contamination of and damage to an imaging system that includes the image capturing lens 103, the shutter 101 and the imaging unit 22.

An image processing unit 24 performs a predetermined pixel interpolation, resize processing (reduction) and color conversion processing on data from the A/D convertor 23 or on data from the memory control unit 15. The image processing unit 24 also performs predetermined arithmetic processing using captured image data. Based on the operation result acquired from the image processing unit 24, the system control unit 50 performs the exposure control and distance measurement control. Thereby the through-the-lens (TTL) type auto focus (AF) processing, auto exposure (AE) processing and electro flash pre-emission (EF) processing are performed. The image processing unit 24 further performs predetermined arithmetic processing using captured image data, and performs the TTL type auto white balance (AWB) processing based on the acquired operation result.

The output data from the A/D convertor 23 is written to the memory 32 via the image processing unit 24 and the memory control unit 15, or directly via the memory control unit 15. The memory 32 stores image data, which is acquired by the imaging unit 22 and is converted into the digital data by the A/D convertor 23, and image data to be displayed on the display unit 28. The memory 32 has a memory capacity that is sufficient to store a predetermined number of still images and a predetermined time of moving images and sound.

The memory 32 is also used as the memory (video memory) to display images. A D/A convertor 13 converts image data for display, which is stored in the memory 32, into an analog signal, and supplies the analog signal to the display unit 28. Thus the image data for display, which is written in the memory 32, is displayed on the display unit 28 via the D/A convertor 13. The display unit 28 performs display on the display unit (e.g. LCD), in accordance with the analog signal from the D/A convertor 13. The image data, which was converted into the digital signal by the A/D convertor 23 and stored in the memory 32, is converted into an analog signal by the D/A convertor 13, and is sequentially transferred to and display on the display unit 28. Thereby the functions of an electronic view finder are implemented, and a through-image display (live view (LV) display) can be performed. Hereafter an image that is displayed by the live view display is called and "LV" image.

A non-volatile memory 56 is a memory that is a recording medium which can be erased and recorded electrically, and is an EEPROM, for example. In the non-volatile memory 56, constants, programs and the like, for operating a system control unit 50, are recorded. Programs here refer to computer programs that execute various flow charts which will be described later in this embodiment.

The system control unit 50 is a control unit that includes at least one processor or circuit, and controls the entire digital camera 100. The system control unit 50 implements each of the later mentioned processing of this embodiment by executing the program recorded in the above mentioned non-volatile memory 56. For the system memory 52, RAM, for example, is used. In the system memory 52, constants and variables for operating the system control unit 50, programs read from the non-volatile memory 56 and the like, are developed. The system control unit 50 also performs display control by controlling the memory 32, the D/A convertor 13, the display unit 28 and the like.

A system timer 53 is a clocking unit that counts time used for various controls and the time of the internal clock. The shooting mode dial 60, the shutter button 61, the power switch 72 and the operation unit 70 are used to input various operation instructions to the system control unit 50. The shutter button 61 includes a first shutter switch 62 and a second shutter switch 64.

The shooting mode dial 60 switches the operation mode of the system control unit 50 to one of a still image shooting mode, a plus movie mode and a moving image shooting mode. The still image shooting mode includes an auto shooting mode, an auto scene determination mode, a manual mode, an aperture priority mode (Av mode), a shutter speed priority mode (Tv mode), and a program AE mode. Further, the still image shooting mode includes various scene modes and custom modes, which are shooting settings for each shooting scene. Depending on the position indicated by the shooting mode dial 60, one of the auto shooting mode, auto scene determination mode, manual mode, aperture priority mode (Av mode), shutter speed priority mode (Tv mode), program AE mode, scene mode, custom mode, moving image shooting mode and plus movie mode is set. The user can select one of these shooting modes by rotating the shooting mode dial 60. Further, after switching the shooting mode to the scene mode using the shooting mode dial 60, one of a plurality of shooting modes included in the scene mode (e.g. selfie mode (self-portrait mode), starry sky shooting mode, kids and pets shooting mode) may be selected and set. In the same manner, as the still image shooting mode, the moving image shooting mode may include a plurality of modes.

The first shutter switch 62 is turned ON in the middle of the operation of the shutter button 61 disposed in the digital camera 100, that is, in the half-depressed state (shooting preparation instruction), and generates a first shutter switch signal SW1. By the first shutter switch signal SW1, the system control unit 50 starts such operations as the auto focus (AF) processing, auto exposure (AE) processing, auto white balance (AWB) processing and electro flash pre-emission (EF) processing.

The second shutter switch 64 is turned ON when operation of the shutter button 61 completes, that is, in the fully depressed state (shooting instruction), and generates a second shutter switch signal SW2. By the second shutter switch signal SW2, the system control unit 50 starts a series of shooting processing operations, from reading a signal from the imaging unit 22 to writing the image data to the recording medium 200.

A function is assigned to each operation member of the operation unit 70 for each scene by selecting various function icons displayed on the display unit 28, whereby each operation member functions as a specific function button. The function buttons are, for example, an end button, a return button, an image forward button, a jump button, a preview button, and an attribute change button. For example, if the menu button is pressed, various settable menu screen names are displayed on the display unit 28. The user can perform various settings intuitively using the menu screen displayed on the display unit 28, the four-way key 73 and the set button.

A power control unit 80 is constituted of a battery detection circuit, a DC-DC convertor, a switch circuit to switch an energized block and other components, and detects whether a battery is installed, a type of battery, and the residual amount of battery power. Further, the power control unit 80 controls a DC/DC convertor based on this detection result and instructions from the system control unit 50, and supplies the necessary voltage to each component including the recording medium 200 during a required period. A power supply unit 30 is constituted of a primary battery (e.g. alkali battery, lithium battery), a secondary battery (e.g. NiCd battery, NiMH battery, Li battery), an AC adapter and the like.

A recording medium I/F 18 is an interface with the recording medium 200 (e.g. memory card, hard disk). The recording medium 200 is a recording medium to record captured images, and is constituted of a semiconductor memory, an optical disk, a magnetic disk or the like.

A communication unit 54 transmits or receives video signal and audio signals wirelessly or via cable. The communication unit 54 can be connected to a wireless local area network (LAN) and the Internet. The communication unit 54 can send an image (including a through image) captured by the imaging unit 22 and an image recorded in the recording medium 200, and can receive image data and various other information from an external apparatus.

An attitude detection unit 55 detects an attitude of the digital camera 100 with respect to the direction of gravity. Based on the attitude detected by the attitude detection unit 55, it can be determined whether an image captured by the imaging unit 22 is an image captured by the digital camera 100 that is held horizontally, or an image captured by the digital camera 100 that is held vertically. The system control unit 50 can attach the orientation information, in accordance with the attitude detected by the attitude detection unit 55, to an image file of an image captured by the imaging unit 22, or can record a rotated image. For the attitude detection unit 55, an acceleration sensor, a gyro sensor or the like can be used. Further, using the attitude detection unit 55 (e.g. acceleration sensor, gyro sensor), the movement of the digital camera 100 (e.g. pan, tilt, lift, remaining still) can be detected.

Figure 3:
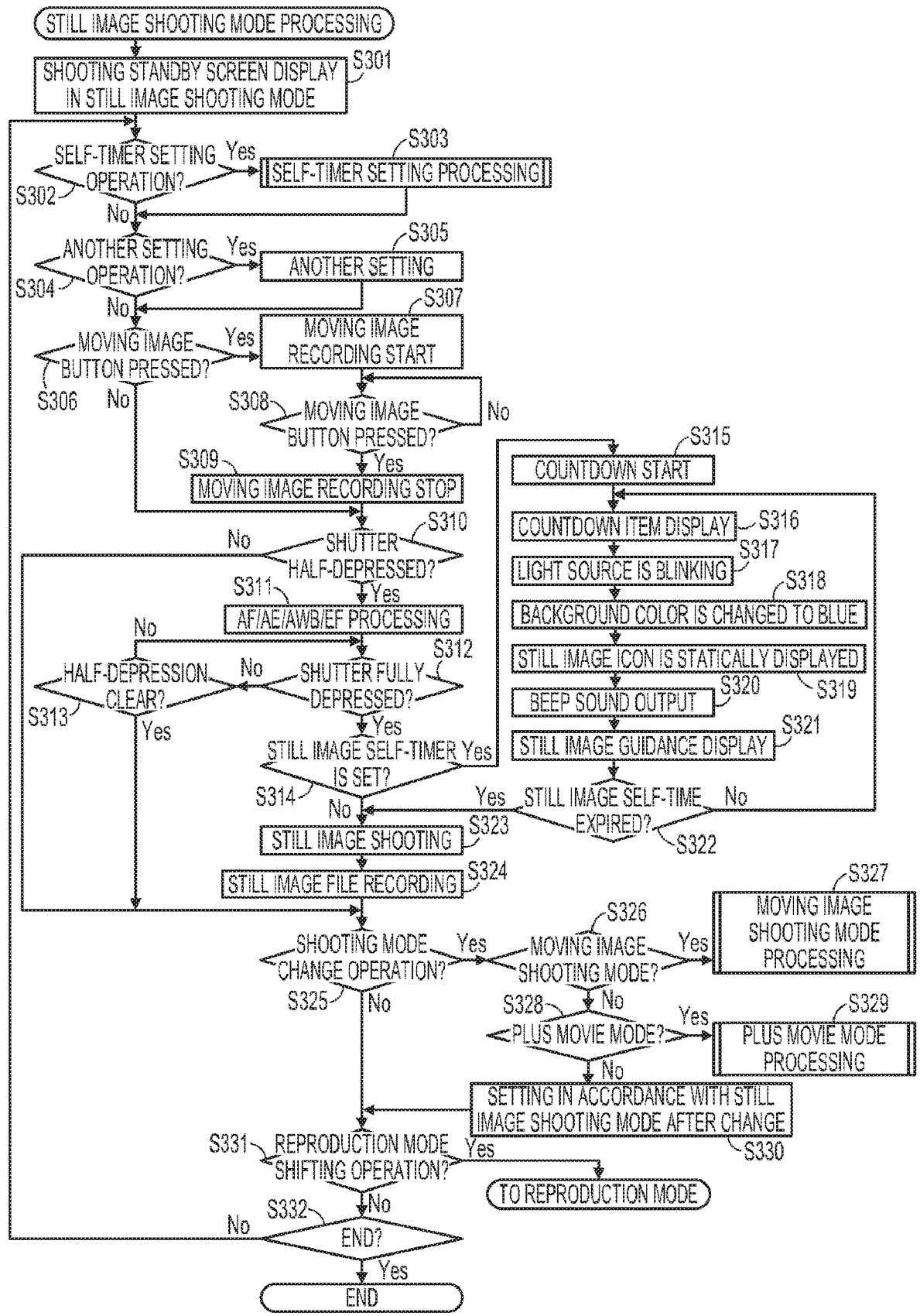
FIG. 3 is a flow chart depicting still image shooting mode processing.

FIG. 3 is a flow chart depicting details of the still image shooting mode processing performed by the digital camera 100. This processing is implemented by the system control unit 50 developing the program, which is recorded in the non-volatile memory 56, in the system memory 52, and executing the program. When the digital camera 100 is started in still image shooting mode or when the system control unit 50 switches the mode to the still image shooting mode, the processing in FIG. 3 starts.

Figure 7A:
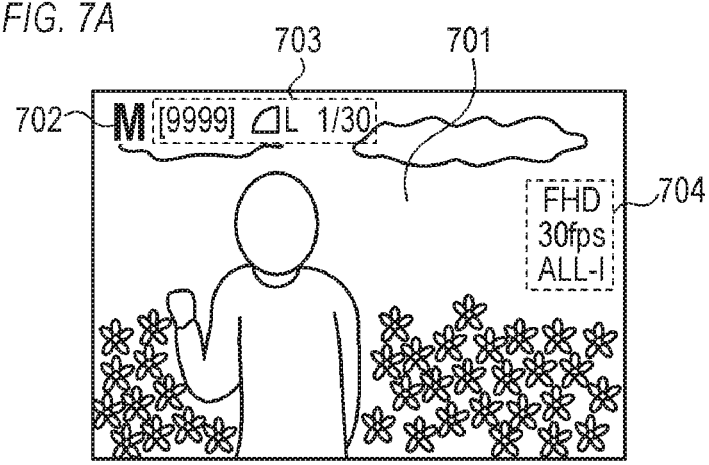
FIGS. 7A to 7C are an example of shooting standby screens.

In step S301, the system control unit 50 displays the shooting standby screen in the still image shooting mode on the display unit 28. FIG. 7A is an example of the shooting standby screen in the still image shooting mode. In the screen in FIG. 7A, an LV image 701 and the items 702 to 704 are displayed. The item 702 is an icon that indicates that the mode is the still image shooting mode (manual mode), and the item 703 is an item that indicates the still image shooting setting (e.g. remaining number of shots that can be taken, image quality, shutter speed). The item 704 is an item that indicates the moving image shooting setting (e.g. resolution, frame rate, compression system).

In step S302, the system control unit 50 determines whether the self-timer setting operation was performed. Processing advances to step S303 if it is determined that the self-timer setting operation was performed, or to step S304 if not.

In step S303, the system control unit 50 performs self-timer setting processing. The self-timer setting processing will be described in detail later with reference to FIG. 6.

In step S304, the system control unit 50 determines whether another setting operation was performed. Processing advances to step S305 if it is determined that another setting operation was performed, or to step S306 if not.

In step S305, the system control unit 50 performs another setting (setting in accordance with the setting operation determined in step S304). For example, the system control unit 50 performs setting (changing) of the image quality; shutter speed, aperture. ISO sensitivity and the like.

In step S306, the system control unit 50 determines whether the moving image button 76 was pressed. Processing advances to step S307 if it is determined that the moving image button 76 was pressed, or to step S310 if not.

In step S307, the system control unit 50 starts recording a moving image (moving image generated by reading signals from the imaging unit 22, captured moving image) to the recording medium 200. In step S308, the system control unit 50 determines whether the moving image button 76 was pressed, and waits for the moving image button 76 to be pressed if not pressed. Processing advances to step S309 if it is determined that the moving image button 76 was pressed. In step S309, the system control unit 50 stops recording of the moving image. Thereby a moving image file, which corresponds to the moving image, from the pressing of the moving image button 76 in step S306 to the pressing of the moving image button 76 again in step S308, is generated. Thus in this embodiment, the moving image shooting (not self-timer shooting) can be performed even in the still image shooting mode.

In step S310, the system control unit 50 determines whether the shutter button 61 was half-depressed. In other words, the system control unit 50 determines whether the first shutter switch signal SW1 was generated by turning the first shutter switch 62 ON. Processing advances to step S311 if it is determined that the shutter button 61 was half-depressed or to step S325 if not.

In step S311, the system control unit 50 starts the shooting preparation operation, such as the auto focus (AF) processing, auto exposure (AE) processing, auto white balance (AWB) processing and electro flash pre-emission (EF) processing.

In step S312, the system control unit 50 determines whether the shutter button 61 was fully depressed. In other words, the system control unit 50 determines whether the second shutter switch signal SW2 was generated by turning the second shutter switch 64 ON. Processing advances to step S314 if it is determined that the shutter button 61 was fully depressed, or to step S313 if not.

In step S313, the system control unit 50 determines whether the half-depression of the shutter button 61 was cleared. Processing advances to step S325 if it is determined that the half-depression was cleared, or to step S312 if not (if half-depression continues).

In step S314, the system control unit 50 determines whether the still image self-timer (self-timer of the still image shooting mode) is set. Processing advances to step S315 if it is determined that the still image self-timer is set, or to step S323 if not.

In step S315, the system control unit 50 starts countdown of the still image self-timer.

Figure 8A:
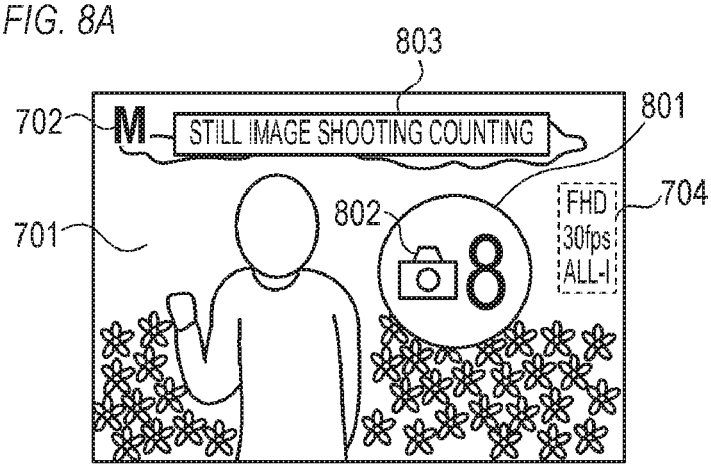
FIGS. 8A to 8C are an example of screens that are displayed during countdown of the self-timer.

In step S316, the system control unit 50 displays an item (item for countdown), in accordance with the remaining time of the countdown of the still image self-timer, on the display unit 28. FIG. 8A is an example of the screen displayed on the display unit 28 during countdown (clocking) of the still image self-timer on the screen in FIG. 8A. The LV image 701 and items 702, 704 and 801 to 803 are displayed. The item 801 is an item for countdown of the self-timer shooting of the still image, and is displayed in a relatively small size. The item 801 is circular, and a numeric value which indicates the remaining time of countdown is written in the item 801. The item 802 is an icon to indicate the still image shooting. The item 803 is a character string which indicates that the still image shooting is being performed, and that counting of the self-timer shooting of the still image is ongoing, for example. The user can easily recognize that the still image shooting will be performed by the relatively small sized item 801, the display of the icon 802 and the display of the character string 803. The items 801 to 803 are not displayed before countdown (before clocking) of the still image self-timer. In step S316, the item 801 is displayed, and the icon 802 and the character string 803 are displayed in the later mentioned steps S319 and S321.

In step S317, the system control unit 50 controls the light source 140 to blink. In the moving image shooting mode, the light source 140 is lit, which will be described in detail later.

Therefore the user can recognize that the still image shooting will be performed by the blinking of the light source 140 as well.

In step S318, the system control unit 50 makes the hue of the background (LV image 701) of the item 801 for countdown to be closer to blue. For example, a semi-transparent blue mask is superimposed on the LV image 701. Thereby the background (LV image 701) of the item 801 for countdown is displayed in a bluish color. In the moving image shooting mode, the hue of the background of the item for countdown is made to be closer to red, which will be described in detail later. Therefore the user can recognize that still image shooting will be performed by the hue of the background (LV image 701) of the item for countdown.

In step S319, the system control unit 50 statically displays the icon 802 to indicate the still image shooting on the display unit 28. In the moving image shooting mode, the icon having a different pattern from the icon 802 is dynamically displayed as an icon to indicate the moving image shooting, which will be described in detail later. Therefore the user can recognize that the still image shooting will be performed by the pattern of the icon 802 and the icon 802 which is a still image.

In step S320, the system control unit 50 sounds a beep sound via the speaker 92.

In step S321, the system control unit 50 displays a character string 803 (guidance) which indicates that the still image shooting is performed, and that the counting of the self-timer shooting of the still image is ongoing, on the display unit 28.

In step S322, the system control unit 50 determines whether the still image self-timer has expired (the setup time has elapsed since the start of the countdown of the still image self-timer). Processing advances to step S323 if it is determined that the still image self-timer has expired, or to step S316 if not.

In step S323, the system control unit 50 performs the still image shooting including reading signals from the imaging unit 22.

In step S324, the system control unit 50 records the still image, which was captured in step S323, in the recording medium 200 as the still image file.

In step S325, the system control unit 50 determines whether the shooting mode change operation (operation of the shooting mode dial 60; operation to change the shooting mode) was performed. Processing advances to step S326 if it is determined that the shooting mode change operation was performed, or to step S331 if not.

In step S326, the system control unit 50 determines whether the shooting mode change operation in step S325 is an operation to change the mode to the moving image shooting mode. Processing advances to step S327 if it is determined that the shooting mode change operation is an operation to change the mode to the moving image shooting mode, or to step S328 if not.

In step S327, the system control unit 50 performs the moving image shooting mode processing. The moving image shooting mode processing will be described in detail later with reference to FIG. 4.

In step S328, the system control unit 50 determines whether the shooting mode change operation in step S325 is an operation to change the mode to the plus movie mode. Processing advances to step S329 if it is determined that the shooting mode change operation is an operation to change the mode to the plus movie mode, or to step S330 if not (if the operation is an operation to change the mode to another still image shooting mode).

In step S329, the system control unit 50 performs plus move mode processing. The plus movie mode processing will be described in detail later with reference to FIG. 5.

In system S330, the system control unit 50 performs setting in accordance with the still image shooting mode after the change. The change from a still image shooting mode to another still image mode is a change among a plurality of shooting modes included in the still image shooting modes (e.g. auto shooting mode, auto scene determination mode, manual mode, aperture priority mode (Av mode), shutter speed priority mode (Tv mode), program AE mode, scene mode, custom mode).

In step S331, the system control unit 50 determines whether the reproduction mode switching operation (pressing the reproduction button 74: operation to shift to the reproduction mode) was performed. The current mode is shifted to the reproduction mode if it is determined that the reproduction mode shifting operation was performed, or processing advances to step S332 if not.

In step S332, the system control unit 50 determines whether the still image shooting mode processing ended. For example, the system control unit 50 determines that the still image shooting mode processing ends when an operation to instruct power OFF of the digital camera 100 (pressing power switch 72) is performed. The still image shooting mode processing ends if it is determined that the still image shooting mode ends, or processing advances to step S302 if not.

Figure 4:
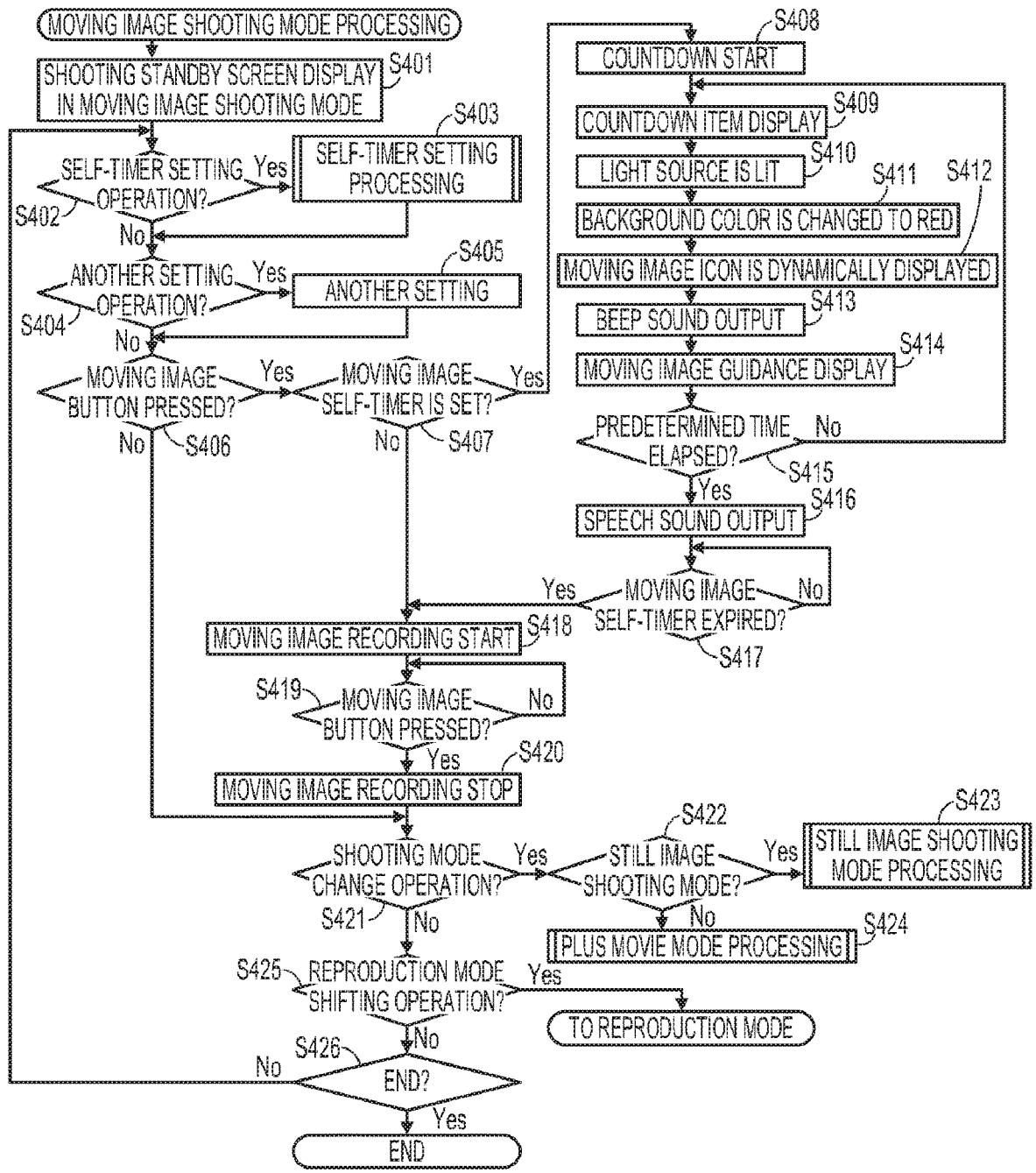
FIG. 4 is a flow chart depicting moving image shooting mode processing.

FIG. 4 is a flow chart depicting details of the moving image shooting mode processing performed by the digital camera 100. This processing is implemented by the system control unit 50 developing the program, which is recorded in the non-volatile memory 56, in the system memory 52, and executing the program. When the digital camera 100 is started in the moving image shooting mode, or when the system control unit 50 switches the mode to the moving image shooting mode, the processing in FIG. 4 starts.

Figure 7B:
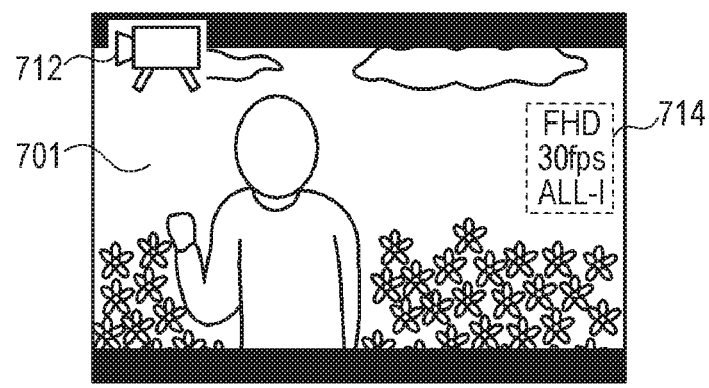

In step S401, the system control unit 50 displays the shooting standby screen in the moving image shooting mode on the display unit 28. FIG. 7B is an example of the shooting standby screen in the moving image shooting mode. The LV image 701 and items 712 and 714 are displayed on the screen in FIG. 7B. The item 712 is an icon that indicates that the mode is the moving image shooting mode, and the item 714 is an item that indicates the moving image shooting setting (e.g. resolution, frame rate, compression system).

In step S402, the system control unit 50 determines whether the self-timer setting operation was performed. Processing advances to step S403 if it is determined that the self-timer setting operation was performed, or to step S404 if not.

In step S403, the system control unit 50 performs self-timing setting processing. The self-timer setting processing will be described in detail later with reference to FIG. 6.

In step S404, the system control unit 50 determines whether another setting operation was performed. Processing advances to step S405 if it is determined that another setting operation was performed, or to step S406 if not.

In step S405, the system control unit 50 performs the other setting (setting in accordance with the setting operation determined in step S404). For example, the system control unit 50 performs setting (changing) of the resolution, frame rate, compression system and the like.

In step S406, the system control unit 50 determines whether the moving image button 76 was pressed. Processing advances to step S407 if it is determined that the moving image button 76 was pressed, or to step S421 if not.

In step S407, the system control unit 50 determines whether a moving image self-timer (self-timer of the moving image shooting mode) is set. Processing advances to step S408 if it is determined that the moving image self-timer is set, or to step S418 if not.

In step S408, the system control unit 50 starts countdown of the moving image self-timer.

Figure 8B:
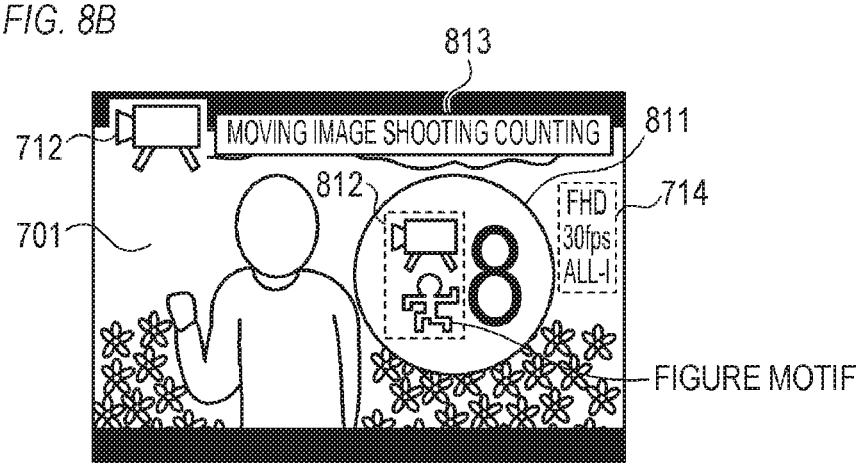

In step S409, the system control unit 50 displays an item (item for countdown), in accordance with the remaining time of the countdown of the moving image self-timer, on the display unit 28. FIG. 8B is an example of the screen displayed on the display unit 28 during countdown of the moving image self-timer. The LV image 701, and items 712, 714 and 811 to 813 are displayed on the screen in FIG. 8B. The item 811 is an item for countdown of the self-timer shooting of the moving image, and is displayed in a relatively large size (size that is larger than the item 801 in FIG. 8A). The item 811 is circular, and a numeric value which indicates the remaining time of countdown is written in the item 811. The item 812 is an icon to indicate the moving image shooting. The item 813 is a character string which indicates that the moving image shooting is being performed, and that the counting of the self-timer shooting of the moving image is ongoing, for example. The user can easily recognize that the moving image shooting will be performed by the relatively large size of the item 811, the display of the icon 812 and the display of the character string 813. The items 811 to 813 are not displayed before countdown of the moving image self-timer. In step S409, the item 811 is displayed, and the icon 812 and the character string 813 are displayed in the later mentioned steps S412 and S414.

In step S410, the system control unit 50 lights (non-blinking) the light source 140. In the still image shooting mode, the light source 140 blinks, therefore the user can also recognize that the moving image shooting will be performed by lighting of the light source 140 as well.

In step S411, the system control unit 50 makes the hue of the background (LV image 701) of the item 811 for countdown to be closer to red. For example, a semi-transparent red mask is superimposed on the LV image 701. Thereby the background (LV image 701) of the item 811 for countdown is displayed in a reddish color. In the still image shooting mode, the hue of the background of the item for countdown is made to be closer to blue, therefore the user can recognize that the moving image shooting will be performed by the hue of the background (LV image 701) of the item for countdown.

In step S412, the system control unit 50 dynamically displays the icon 812, which indicates the moving image shooting, on the display unit 28. In FIG. 8B, a figure motif is written in the icon 812, and the figure moves as if it were dancing. In the still image shooting mode, the icon 802, of which pattern is different from the icon 812, is statically displayed as an icon to indicate the still image shooting. Therefore the user can recognize that the moving image shooting will be performed by the pattern of the icon 812 and the icon 812 which is a moving image.

In step S413, the system control unit 50 sounds a beep sound via the speaker 92.

In step S414, the system control unit 50 displays a character string 813 (guidance) which indicates that the moving image shooting is performed, and that the counting of the self-timer shooting of the moving image is ongoing, for example, on the display unit 28.

In step S415, the system control unit 50 determines whether the remaining time of the moving image self-timer has reached a predetermined time (a threshold time (setup time—predetermined time) has elapsed since the start of the countdown of the moving image self-timer). If the setup time of the moving image self-timer is 10 seconds and the predetermined time is one second, it is determined whether nine second have elapsed since the start of the countdown of the moving image self-timer. Processing advances to step S416 if it is determined that the remaining time reached the predetermined time, or to step S409 if not.

In step S416, the system control unit 50 voices the word "action", for example, via the speaker 92. By sounding a beep sound until the middle of the countdown of the moving image self-timer and voicing "action" in the end, the individual (object) can appropriately (smoothly) start movement aiming at the start of recording of the moving image.

In step S417, the system control unit 50 determines whether the moving image self-timer has expired (the setup time has elapsed since the start of the countdown of the moving image self-timer), and waits for the moving image self-timer to expire or not expire. If the setup time of the moving image self-timer is 10 seconds, it is determined whether 10 seconds have elapsed since the start of the countdown of the moving image self-timer. Processing advances to step S418 if it is determined that the moving image self-timer has expired.

In step S418, the system control unit 50 starts recording the moving image (moving image generated by reading signals from the image unit 22: captured moving image) to the recording medium 200. In step S419, the system control unit 50 determines whether the moving image button 76 was pressed, and waits for the moving image button 76 to be pressed or not pressed. Processing advances to step S420 if it is determined that the moving image button 76 was pressed. In step S420, the system control unit 50 stops the recording of the moving image. Thereby in the case of moving image shooting that is not the self-timer shooting, a moving image file, which corresponds to the moving image, from the pressing of the moving image button 76 in step S406 to pressing the moving image button 76 again in step S419, is generated. In the case of the self-timer shooting of the moving image, a moving image file which corresponds to the moving image, from expiration of the moving image self-timer to the pressing of the moving image button 76 in step S419, is generated.

In step S421, the system control unit 50 determines whether the shooting mode change operation was performed. Processing advances to step S422 if it is determined that the shooting mode change operation was performed, or to step S425 if not.

In step S422, the system control unit 50 determines whether the shooting mode change operation in step S421 is an operation to change the mode to the still image shooting mode. Processing advances to step S423 if it is determined that the shooting mode change operation is an operation to change the mode to the still image shooting mode, or to step S424 if not (if it is an operation to change the mode to the plus movie mode).

In step S423, the system control unit 50 performs the still image shooting mode processing in FIG. 3. In step S424, the system control unit 50 performs the plus movie mode processing. The plus movie mode processing will be described in detail later with reference to FIG. 5.

In step S425, the system control unit 50 determines whether the reproduction mode shifting operation was performed. The mode is shifted to the reproduction mode if it is determined that the reproduction mode shifting operation was performed, or processing advances to step S426 if not.

In step S426, the system control unit 50 determines whether the moving image shooting mode processing ends. For example, the system control unit 50 determines that the moving image shooting mode processing ends when the operation to instruct power OFF of the digital camera 100 (pressing power switch 72) is performed. The moving image shooting mode processing ends if it is determined that the moving image shooting mode ends, or processing advances to step S402 if not.

Figure 5:
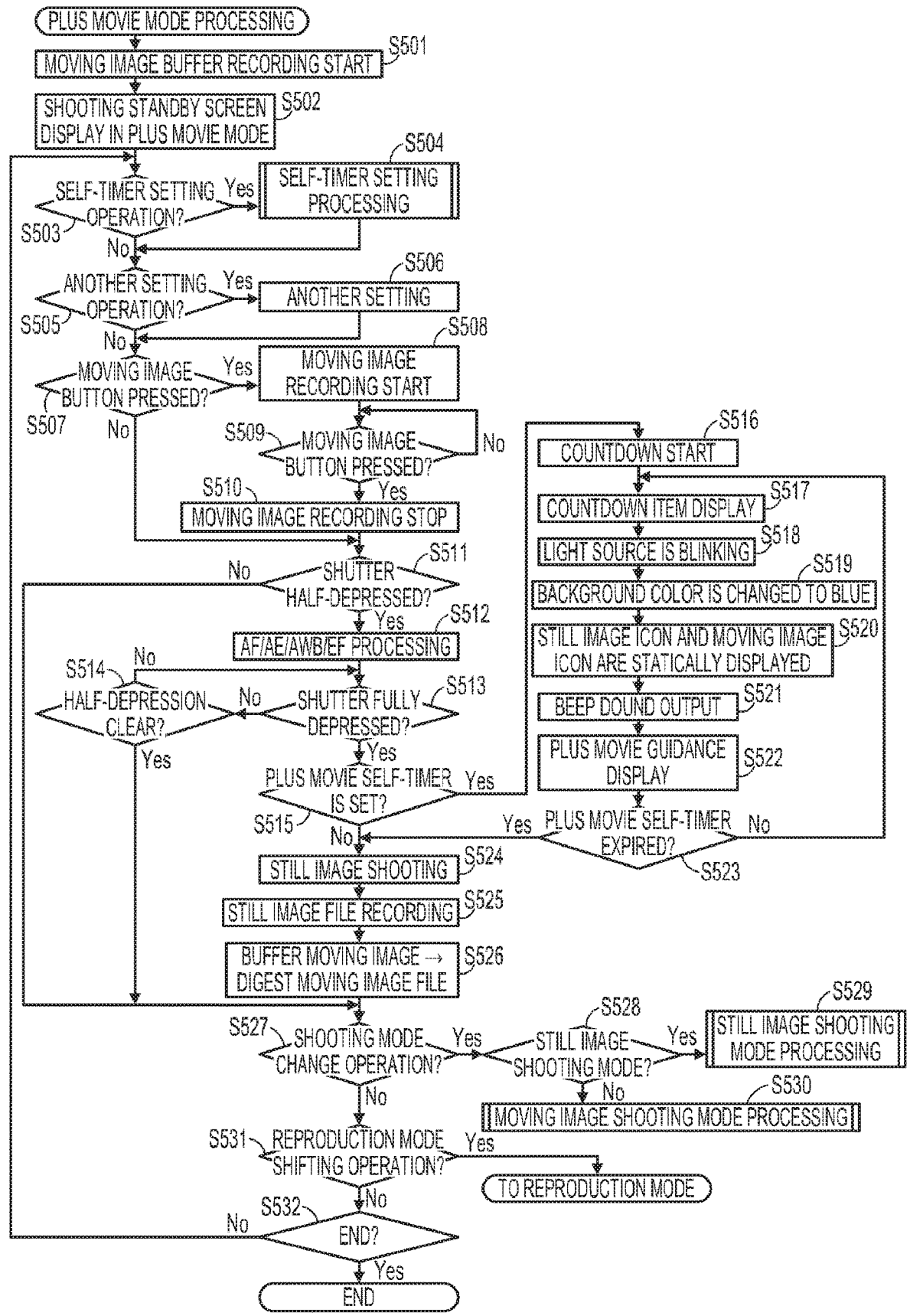
FIG. 5 is a flow chart depicting plus movie mode processing.

FIG. 5 is a flow chart depicting details of the plus movie mode processing performed by the digital camera 100. This processing is implemented by the system control unit 50 developing the program, which is recorded in the non-volatile memory 56, in the system memory 52, and executing the program. When the digital camera 100 is started in the plus move mode, or when the system control unit 50 switches the mode to the plus movie mode, the processing in FIG. 5 starts.

In the plus movie mode, for each still image captured during a predetermined period (e.g. each day), a predetermined time of a moving image is captured before shooting still images, so that the moving image file, linked with this moving image, is recorded in association with each still image. In other words, in the plus movie mode, at least one still image is associated with one moving image. Further, in the plus movie mode, a moving image is generated as a digest moving image when a still image is captured for the first time in the predetermined period, and thereafter a predetermined time of the moving image before shooting is added to this moving image every time a still image is captured, without changing the file name. This addition is executed unless the file capacity or the time of an entire moving image exceeds a value predetermined as the capacity or the time of one digest moving image, hence essentially only one moving image file is recorded in a predetermined period.

In step S501, the system control unit 50 starts recording a moving image (captured moving image) to the memory 32 (buffer). A predetermined time, such as four seconds, is set as the longest time to record the moving image to the memory 32. If the time to record a moving image to the memory 32 exceeds this longest time, the system control unit 50 deletes the moving image for the amount of the exceeded time in sequence from the oldest frame.

Figure 7C:
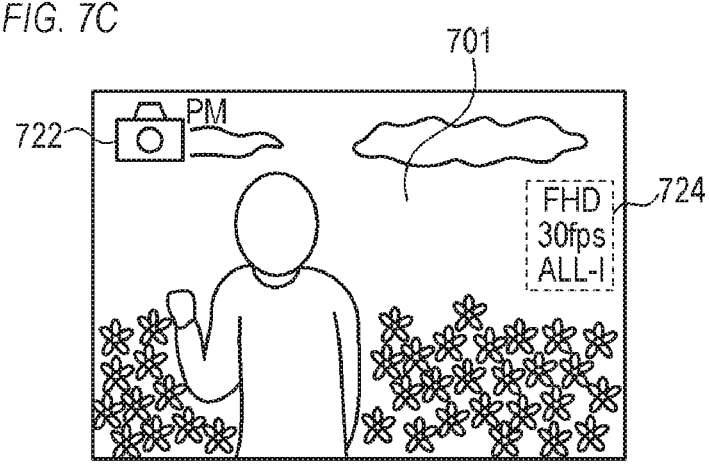

In step S502, the system control unit 50 displays the shooting standby screen in the plus movie mode on the display unit 28. FIG. 7C is an example of the shooting standby screen in the plus movie mode. The LV image 701 and items 722 and 724 are displayed on the screen in FIG. 7C. The item 722 is an icon that indicates that the mode is the plus movie mode, and the item 724 is an item that indicates the moving image shooting setting (e.g. resolution, frame rate, compression system).

In step S503, the system control unit 50 determines whether the self-timer setting operation was performed. Processing advances to step S504 if it is determined that the self-timer setting operation was performed, or to step S505 if not.

In step S504, the system control unit 50 performs self-timer setting processing. The self-timer setting processing will be described in detail later with reference to FIG. 6.

In step S505, the system control unit 50 determines whether another setting operation was performed. Processing advances to step S506 if it is determined that another setting operation was performed, or to step S507 if not.

In step S506, the system control unit 50 performs the other setting (setting in accordance with the setting operation determined in step S505). For example, the system control unit 50 performs setting (changing) of image quality, shutter speed, aperture, ISO sensitivity and the like for the still image shooting, or performs setting (changing) of resolution, frame rate, compression system and the like for the moving image shooting.

In step S507, the system control unit 50 determines whether the moving image button 76 was pressed. Processing advances to step S508 if it is determined that the moving image button 76 was pressed, or to step S511 if not.

In step S508, the system control unit 50 starts recording the moving image (moving image generated by reading signals from the imaging unit 22, captured moving image that is not the digest moving image) to the recording medium 200. In step S509, the system control unit 50 determines whether the moving image button 76 was pressed, and waits for the moving image button 76 to be pressed or not pressed. Processing advances to step S510 if it is determined that the moving image button 76 was pressed. In step S510, the system control unit 50 stops the recording of the moving image. Thereby a moving image file, which corresponds to the moving image, from pressing of the moving image button 76 in step S507 to pressing the moving image button 76 again in step S509, is generated. Thus in this embodiment, the moving image shooting (not self-time shooting and digest moving image shooting) can be performed even in the plus movie mode.

In step S511, the system control unit 50 determines whether the shutter button 61 was half-depressed. In other words, the system control unit 50 determines whether the first shutter switch signal SW1 was generated by turning the first shutter switch 62 ON. Processing advances to step S512 if it is determined that the shutter button 61 was half-depressed, or to step S527 if not.

In step S512, the system control unit 50 starts the shooting preparation operation, such as the auto focus (AF) processing, auto exposure (AE) processing, auto white balance (AWB) processing and electro flash pre-emission (EF) processing.

In step S513, the system control unit 50 determines whether the shutter button 61 was fully depressed. In other words, the system control unit 50 determines whether the second shutter switch signal SW2 was generated by turning the second shutter switch 64 ON. Processing advances to step S515 if it was determined that the shutter button 61 was fully depressed, or to step S514 if not.

In step S514, the system control unit 50 determines whether the half-depression of the shutter button 61 was cleared. Processing advances to step S527 if it is determined that the half-depression was cleared, or to step S513 if not (if half-depression continues).

In step S515, the system control unit 50 determines whether the plus movie self-timer (self-timer of the plus movie mode) is set. Processing advances to step S516 if it is determined that the plus movie self-timer is set, or to step S524 if not.

In step S516, the system control unit 50 starts countdown of the plus movie self-timer.

Figure 8C:
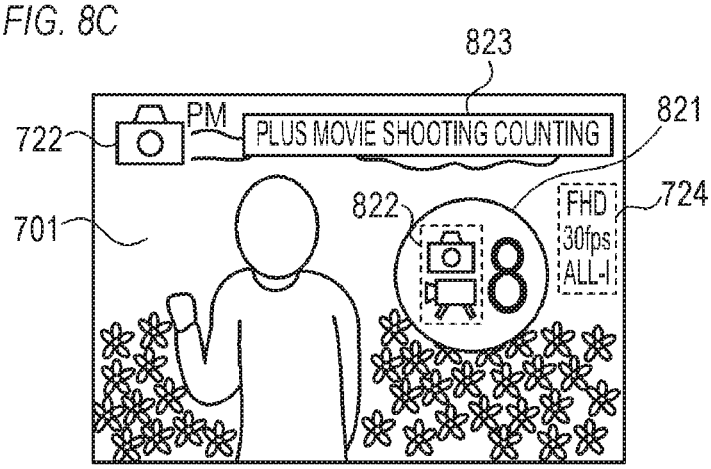

In step S517, the system control unit 50 displays an item (item for countdown), in accordance with the remaining time of the countdown of the plus movie self-timer, on the display unit 28. FIG. 8C is an example of the screen displayed on the display unit 28 during countdown of the plus movie self-timer. The LV image 701, and items 722, 724 and 821 to 823 are displayed on the screen in FIG. 8C. The item 821 is an item for countdown of the self-timer shooting in the plus movie mode (self-timer shooting to record both a still image and a moving image), and is displayed in a relatively small size, just like the self-timer shooting of a still image. The item 821 is circular, and a numeric value which indicates the remaining time of countdown is written in the item 821. In the plus movie mode, both a still image and a moving image are recorded, but the target of the self-timer shooting is a still image. In the plus movie mode, a predetermined time of the moving image before shooting a still image is recorded, and recording of a moving image is not started when the self-timer has expired (self-timer shooting of the moving image is not performed). Therefore the size of the item 821 for countdown is the same as that of the still image shooting mode. The item 822 includes an icon that indicates the still image shooting and an icon that indicates the moving image shooting. The item 823 is a character string which indicates that shooting in the plus movie mode is being performed, and that counting of the self-timer shooting in the plus movie mode is ongoing. The user can easily recognize that a still image will be captured based on the self-timer by the relatively small size of the item 821, the display of the item 822 and the display of the character string 823. Further, the user can easily recognize that a moving image is recorded with the still image by the display of the item 822 and the display of the character string 823. The items 821 to 823 are not displayed before countdown of the plus move self-timer. In step S517, the item 821 is displayed, and the item 822 and the character string 823 are displayed in the later mentioned steps S520 and S522.

In step S518, the system control unit 50 controls the light source 140 to blink, just like the still image shooting mode. Therefore the user can recognize that the still image will be captured based on the self-timer by blinking of the light source 140 as well. The light source 140 may be lit, just like the moving image capturing mode. The light emission of the light source 140 in the plus movie mode may be different from those in the still image shooting mode and the moving image shooting mode.

In step S519, the system control unit 50 makes the hue of the background (LV image 701) of the item 821 for countdown to be closer to blue, just like the still image shooting mode. Therefore the user can recognize that the still image will be captured based on the self-timer by the hue of the background (LV image 701) of the item for countdown. The hue of the background may be made closer to red, just like the moving image shooting mode. The hue of the background in the plus movie mode may be different from those in the still image shooting mode and the moving image shooting mode.

In step S520, the system control unit 50 statically displays the item 822 (an icon which indicates the still image shooting and an icon which indicates the moving image shooting) on the display unit 28. The user can easily recognize that the still image will be captured based on the self-timer and that a moving image is recorded with the still image, by the statically display of both the icon which indicates the still image shooting and the icon which indicates that moving image shooting. The icon which indicates the still image shooting may be displayed without displaying the icon which indicates the moving image shooting. Even in this case, the user can easily recognize that a still image will be captured based on the self-timer. The icon which indicates the moving image shooting may be displayed without displaying the icon which indicates the still image shooting. At least one of the icon which indicates the still image shooting and the icon which indicates the moving image shooting may be dynamically displayed.

In step S521, the system control unit 50 sounds a beep sound via the speaker 92.

In step S522, the system control unit 50 displays a character string 823 (guidance) which indicates that the plus movie mode shooting is performed, and that the counting of the self-timer shooting in the plus move mode is ongoing, on the display unit 28.

In step S523, the system control unit 50 determines whether the plus movie self-timer has expired (the setup time has elapsed since the start of the countdown of the plus move self-timer). Processing advances to step S524 if it is determined that the plus move self-timer has expired, or to step S517 if not.

In step S524, the system control unit 50 performs the still image shooting, including reading signals from the imaging unit 22.

In step S525, the system control unit 50 records the still image, which was captured in step S524, in the recording medium 200 as the still image file.

In step S526, the system control unit 50 records the movie image recorded in the memory 32 (buffer) to the recording medium 200 as at least a part of the digest moving image file (moving image file of the digest moving images). In concrete terms, in the case where the digest moving image file recorded in the current predetermined period does not exist in the recording medium 200, the system control unit 50 records a moving image recorded in the memory 32 to the recording medium 200 as a new digest moving image file. On the other hand, in the case where the digest moving image file recorded in the current predetermined period exists in the recording medium 200, the system control unit 50 links the moving image recorded in the memory 32 to this digest moving image file, and records the moving image as a continuing moving image.

In step S527, the system control unit 50 determines whether the shooting mode change operation was performed. Processing advances to step S528 if it is determined that the shooting mode change operation was performed, or to S531 if not.

In step S528, the system control unit 50 determines whether the shooting mode change operation in step S527 is an operation to change the mode to the still image shooting mode. Processing advances to step S529 if it is determined that the shooting mode change operation is an operation to change the mode to the still image shooting mode, or to step S530 if not (if it is an operation to change the mode to the moving image shooting mode).

In step S529, the system control unit 50 performs the still image shooting mode processing in FIG. 3. In step S530, the system control unit 50 performs the moving image shooting mode processing in FIG. 4.

In step S531, the system control unit 50 determines whether the reproduction mode shifting operation was performed. The mode is shifted to the reproduction mode if it is determined that the reproduction mode shifting operation was performed, or advances to step S532 if not.

In step S532, the system control unit 50 determines whether the plus movie mode processing ends. For example, the system control unit 50 determines that the plus movie mode processing ends when the operation to instruct power OFF of the digital camera 100 (pressing power switch 72) is performed. The plus movie mode processing ends if it is determined that the plus movie mode processing ends, or processing advances to step S503 if not.

Figure 6:
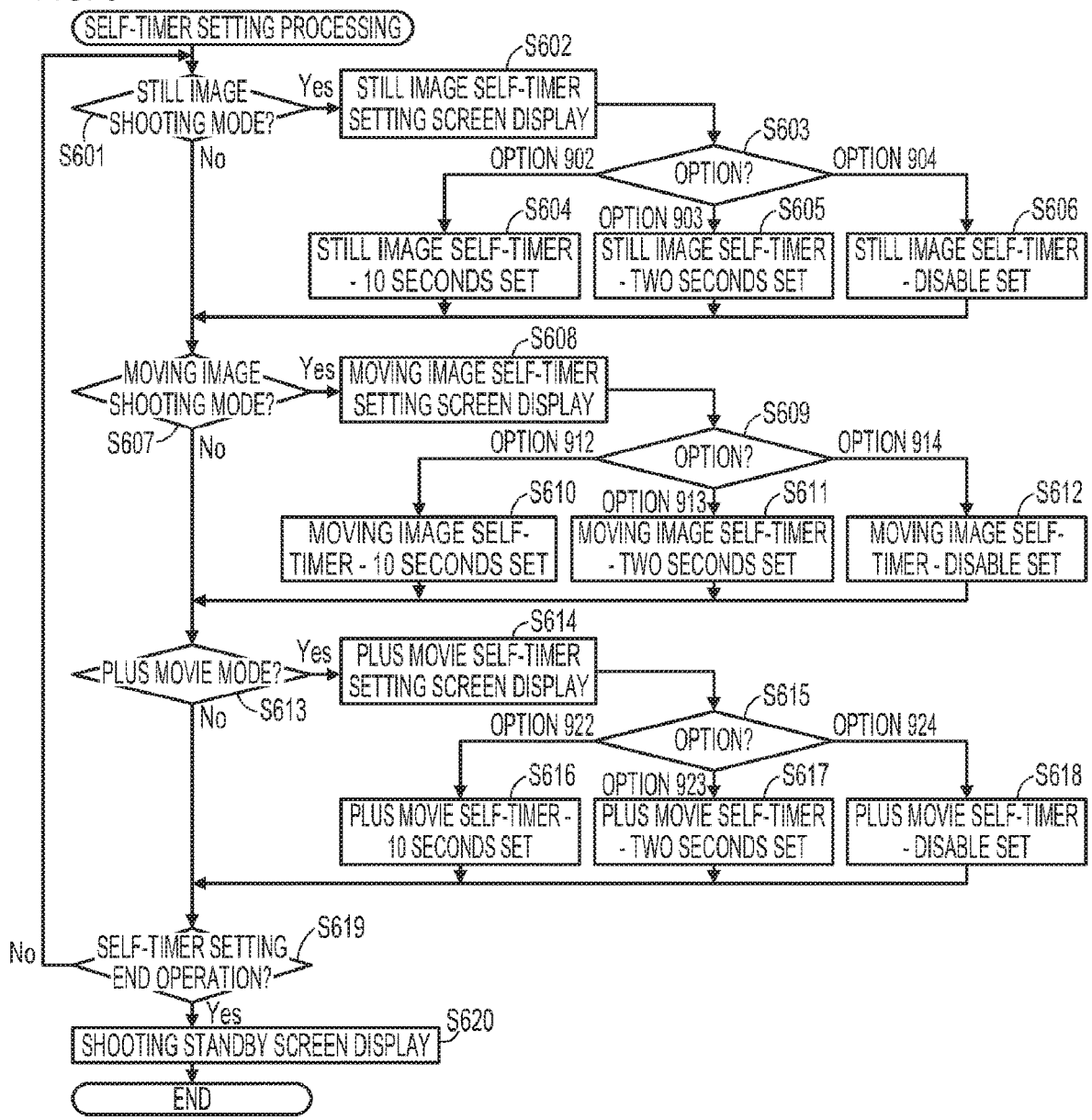
FIG. 6 is a flow chart depicting self-timer setting processing.

FIG. 6 is a flow chart depicting details of the self-timer setting processing (step S303 in FIG. 3, step S403 in FIG. 4, step S504 in FIG. 5) that is performed by the digital camera 100. This processing is implemented by the system control unit 50 developing the program, which is recorded in the non-volatile memory 56, in the system memory 52, and executing the program.

In step S601, the system control unit 50 determines whether the still image shooting mode is set. Processing advances to step S602 if it is determined that the still image shooting mode is set, or to step S606 if not. In the case of the self-timer setting processing in step S303 in FIG. 3 (still image shooting mode processing), processing advances to step S602.

Figure 9A:
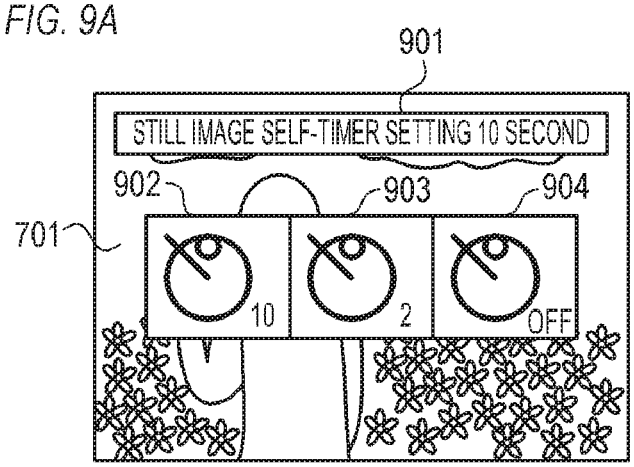
FIGS. 9A to 9C are an example of self-timer setting screens.

In step S602, the system control unit 50 displays a still image self-timer setting screen (setting screen to set the still image self-timer) on the display unit 28. FIG. 9A is an example of the still image self-timer setting screen. The LV image 701 and items 901 to 904 are displayed on the screen in FIG. 9A. The item 901 is a character string (guidance) which indicates the setting of the still image self-timer (e.g. time and enable/disable of the still image self-timer). The items 902 to 904 are options of the setting of the still image self-timer. The option 902 is an option to enable the still image self-timer for 10 seconds, the option 903 is an option to enable the still image self-timer for two seconds, and the option 904 is an option to disable the still image self-timer. The user can set the still image self-timer by selecting one of the options 902 to 904. When the setting of the still image self-timer is changed by selecting one of the options 902 to 904, the character string 901 changes in accordance with the selected option. An arbitrary time in a predetermined range (range: maximum of 20 seconds) may be allowed to be set as the time of the still image self-timer.

In step S603, the system control unit 50 switches the processing in accordance with the selected option. Processing advances to step S604 if it is determined that the option 902 is selected, to step S605 if it is determined that the option 903 is selected, or to step S606 if it is determined that the option 904 is selected.

In step S604, the system control unit 50 sets the still image self-timer to be enabled for 10 seconds, and records this setting to the non-volatile memory 56. When the setting of the still image self-timer is changed by the processing in step S604, the system control unit 50 changes the character string 901 so as to indicate that the still image self-timer is enabled for 10 seconds.

In step S605, the system control unit 50 sets the still image self-timer to be enabled for two seconds, and records this setting to the non-volatile memory 56. When the setting of the still image self-timer is changed by the processing in step S605, the system control unit 50 changes the character string 901 so as to indicate that the still image self-timer is enabled for two seconds.

In step S606, the system control unit 50 sets the still image self-timer to be disabled, and records this setting to the non-volatile memory 56. When the setting of the still image self-timer is changed by the processing in step S606, the system control unit 50 changes the character string 901 so as to indicate that the still image self-timer is disabled.

In step S607, the system control unit 50 determines whether the moving image shooting mode is set. Processing advances to step S608 if it is determined that the moving image shooting mode is set, or to step S613 if not. In the case of the self-timer setting processing in step S403 in FIG. 4 (the moving image shooting mode processing), processing advances to step S608.

Figure 9B:
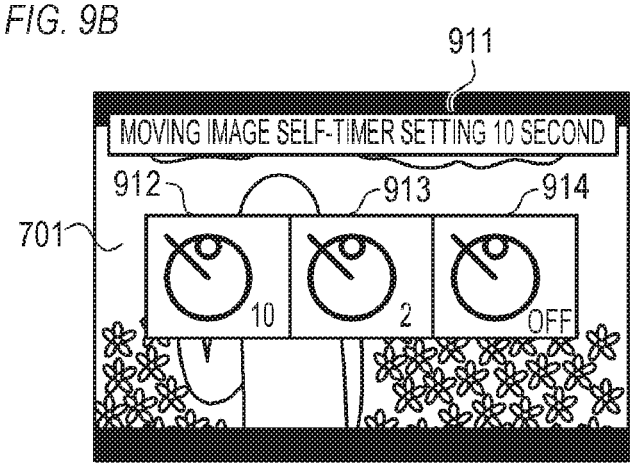

In step S608, the system control unit 50 displays a moving image self-timer setting screen (setting screen to set the moving image self-timer) on the display unit 28. FIG. 9B is an example of the moving image self-timer setting screen. The LV image 701 and items 911 to 914 are displayed on the screen in FIG. 9B. The item 911 is a character string (guidance) which indicates the setting of the moving image self-timer (e.g. time and enable/disable of the moving image self-timer). The items 912 to 914 are options of the setting of the moving image self-timer. The option 912 is an option to enable the moving image self-timer for 10 seconds, the option 913 is an option to enable the moving image self-timer for two seconds, and the option 914 is an option to disable the moving image self-timer. The user can set the moving image self-timer by selecting one of the options 912 to 914. When the setting of the moving image self-timer is changed by selecting one of the options 912 to 914, the character string 911 changes in accordance with the selected option. An arbitrary time in a predetermined range (range: maximum of 20 seconds) may be allowed to be set as the time of the moving image self-timer.

In step S609, the system control unit 50 switches the processing in accordance with the selected option. Processing advances to step S610 if it is determined that the option 912 is selected, to step S611 if it is determined that the option 913 is selected, or to step S612 if it is determined that the option 914 is selected.

In step S610, the system control unit 50 sets the moving image self-timer to be enabled for 10 seconds, and records this setting to the non-volatile memory 56. When the setting of the moving image self-timer is changed by the processing in step S610, the system control unit 50 changes the character string 911 so as to indicate that the moving image self-timer is enabled for 10 seconds.

In step S611, the system control unit 50 sets the moving image self-timer to be enabled for two seconds, and records this setting to the non-volatile memory 56. When the setting of the moving image self-timer is changed by the processing in step S611, the system control unit 50 changes the character string 911 so as to indicate that the moving image self-timer is enabled for two seconds.

In step S612, the system control unit 50 sets the moving image self-timer to be disabled, and records this setting to the non-volatile memory 56. When the setting of the moving image self-timer is changed by the processing in step S612, the system control unit 50 changes the character string 911 so as to indicate that the moving image self-timer is disabled.

In step S613, the system control unit 50 determines whether the plus movie mode is set. Processing advances to step S614 if it is determined that the plus movie mode is set, or to S619 if not. In the case of the self-timer setting processing in step S504 in FIG. 5 (plus movie mode processing), processing advances to step S614.

Figure 9C:
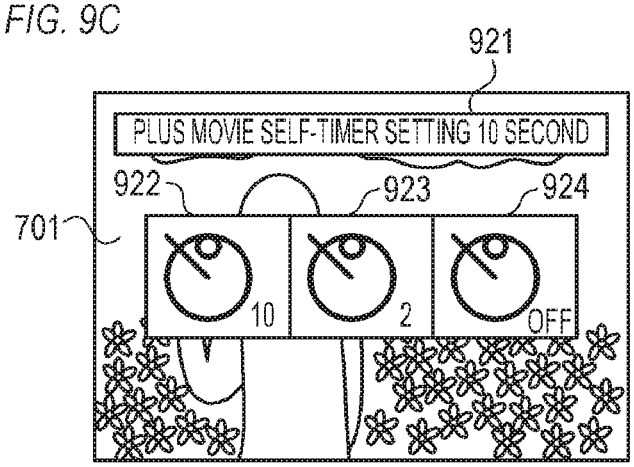

In step S614, the system control unit 50 displays a plus movie self-timer setting screen (setting screen to set the plus movie self-timer) on the display unit 28. FIG. 9C is an example of the plus movie self-timer setting screen. The LV image 701 and items 921 to 924 are displayed on the screen in FIG. 9C. The item 921 is a character string (guidance) which indicates the setting of the plus movie self-timer (e.g. time and enable/disable of the plus movie self-timer). The items 922 to 924 are options of the setting of the plus movie self-timer. The option 922 is an option to enable the plus movie self-timer for 10 seconds, the option 923 is an option to enable the plus movie self-timer for two seconds, and the option 924 is an option to disable the plus movie self-timer. The user can set the plus movie self-timer by selecting one of the options 922 to 924. When the setting of the plus movie self-timer is changed by selecting one of the options 922 to 924, the character string 921 changes in accordance with the selected option. An arbitrary time in a predetermined range (range: maximum of 20 seconds) may be allowed to be set as the time of the plus movie self-timer.

In step S615, the system control unit 50 switches the processing in accordance with the selected option. Processing advances to step S616 if it is determined that the option 922 is selected, to step S617 if it is determined that the option 923 is selected, or to step S618 if it is determined that the option 924 is selected.

In step S616, the system control unit 50 sets the plus movie self-timer to be enabled for 10 seconds, and records this setting to the non-volatile memory 56. When the setting of the plus movie self-timer is changed by the processing in step S616, the system control unit 50 changes the character string 921 so as to indicate that the plus movie self-timer is enabled for 10 seconds.

In step S617, the system control unit 50 sets the plus movie self-timer to be enabled for two seconds, and records this setting to the non-volatile memory 56. When the setting of the plus movie self-timer is changed by the processing in step S617, the system control unit 50 changes the character string 921 so as to indicate that the plus movie self-timer is enabled for two seconds.

In step S618, the system control unit 50 sets the plus movie self-timer to be disabled, and records this setting to the non-volatile memory 56. When the setting of the plus movie self-timer is changed by the processing in step S618, the system control unit 50 changes the character string 921 so as to indicate that the plus movie self-timer is disabled.

In this way, the still image self-timer, the moving image self-timer and the plus movie self-timer are independently set. The setting of the still image self-timer, the setting of the moving image self-timer and the setting of the plus movie self-timer are recorded in the non-volatile memory 56 independently from one another.

In the examples in FIGS. 9A to 9C, a number of options and types of the options do not depend on the operation mode, but a number of options and types of the options may be different depending on the operation mode. For example, three types of options (10 seconds, two seconds, disabled) may be displayed in the still image shooting mode and the plus movie mode, and four types of options (20 seconds, 15 seconds, 10 seconds, disabled) may be displayed in the moving image shooting mode.

In step S619, the system control unit 50 determines whether the self-timer setting end operation was performed. Processing advances to step S620 if it is determined that the self-timer setting end operation was performed, or to step S601 if not.

In step S620, the system control unit 50 displays a shooting standby screen on the display unit 28 (shifting from one of the self-timer setting screens in FIGS. 9A to 9C to the shooting standby screen). The shooting standby screen in FIG. 7A is displayed in the still image shooting mode, the shooting standby screen in FIG. 7B is displayed in the moving image shooting mode, and the shooting standby screen in FIG. 7C is displayed in the plus movie mode.

As described above, according to this embodiment, the display format of the items for countdown of the self-timer shooting is changed depending on the operation mode. Thereby during the countdown of the self-timer setting, the user can more easily recognize the type of shooting that will be performed. In concrete terms, the user can easily recognize the type of self-timer shooting with certainty from the display format of the items for countdown. As a result, the user can immediately notice when an unintended self-timer shooting is performed in error, and can quickly retry the operation so that the intended self-timer shooting is performed (intended self-timer shooting can be performed quickly).

An aspect ratio of the LV image may be changed in accordance with the aspect ratio of the image to be recorded. Then in the case where the aspect ratios of recorded images are different among a plurality of operation modes, the user can recognize the operation mode based on the aspect ratio of the LV image, and can identify the type of the self-timer shooting. However, if the aspect ratios of the recorded images are the same among a plurality of operation modes, the user cannot easily recognize the type of the self-timer shooting. In this embodiment, the user can recognize the type of the self-timer shooting with more certainty by the display format of the items for countdown, rather than recognition by the aspect ratio.

In the example described in this embodiment, moving image shooting is performed immediately after the moving image button is pressed in the still image shooting mode, regardless the setting, without performing countdown of the self-timer. However, the present invention is not limited to this, and the self-timer shooting of the moving image may be performed when the moving image button is pressed in the still image shooting mode. Further, in the case where the shutter button 61 is pressed in the moving image shooting mode, neither shooting of the still image nor shooting of the moving image may be performed. The self-timer shooting of the moving image may be performed, or the moving image shooting may be performed immediately without performing countdown of the self-timer. The shutter button 61 may be regarded as an operation member dedicated to instructing still image shooting, so that when the shutter button 61 is pressed in the moving image shooting mode, the still image shooting is performed immediately without performing countdown of the self-timer, or self-timer shooting of the still image is performed. Regardless the operation mode, the self-timer shooting of a still image may be performed when the still image shooting instruction is received, and the self-timer shooting of a moving image may be performed when the moving image shooting instruction is received. In the self-timer shooting of a still image, the display format of the items for countdown may be the same format as the still image shooting mode processing, and in the self-timer shooting of a moving image, the display format of the items for countdown may be the same format as the moving image shooting mode processing.

The color of the items for countdown (items 801, 811, 821 in FIGS. 8A to 8C) may change as counting progresses. For example, the color of the items for countdown may be changed every time one second elapses. In concrete terms, the color of the items for countdown may change to orange at 10 seconds, to green at 9 seconds, and to orange at 8 seconds before the self-timer expires.

The light emission of the light source 140 may or may not be the same in steps S317, S410 and S518 in FIGS. 3 to 5. The blinking pattern of the light source 140 may be different among the plurality of operation modes. For example, in the still image shooting mode, the light source 140 blinks once at each second of the countdown, and in the moving image shooting mode, the light source 140 repeats twice quick blinks and once extinction, of which a period is longer than the blinking period, at each second of the countdown. The light emission color of the light source 140 may be changed among the plurality of operation modes. For example, the light source 140 lights in blue in the still image shooting mode, and the light source 140 lights red in the moving image shooting mode. The speed of blinking and the light emission color may be changed in accordance with the remaining time of countdown.

The beep sound may be changed among the steps S320, S413 and S521 in FIGS. 3 to 5. For example, in the still image shooting mode, the beep sound sounds once at every one second in countdown, and in the moving image shooting mode, output of two quick beep sounds and off sound (stop of beep sound output), of which a period is longer than the output period of the beep sound, are repeated at each second of countdown. The beep sound may sound in the still image shooting mode, and a melody may be outputted in the moving image mode.

In each operation mode, the countdown of the self-timer shooting may be stopped by touching the display unit 28 (specifically the touch panel disposed on the display surface of the display unit 28), or by rotating the shooting mode dial 60. Thereby the user who recognized the error can stop the self-timer shooting immediately, and retry the operation.

Figure 10A:
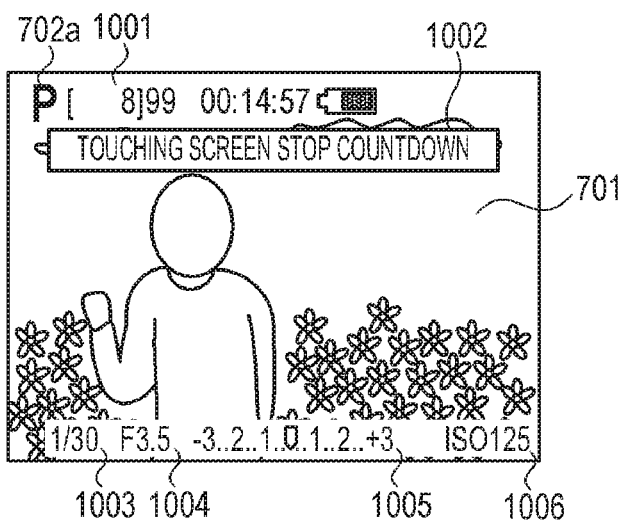
FIGS. 10A to 10C are an example of screens that are displayed during countdown of the self-timer.
Figure 10B:
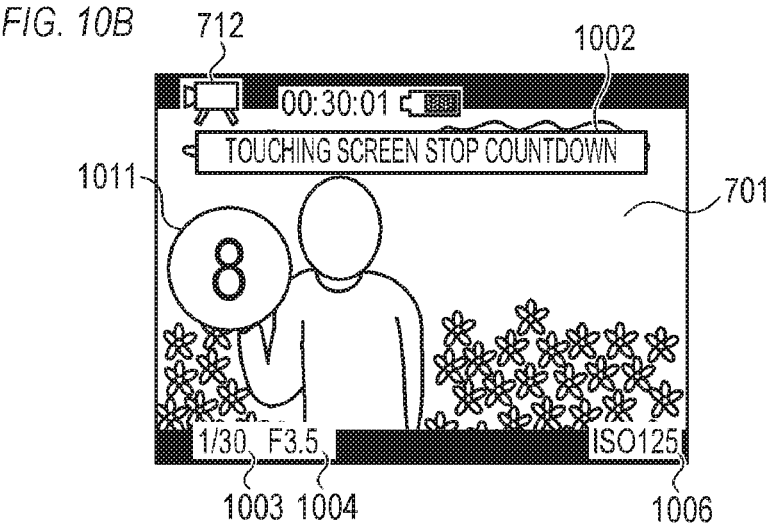
Figure 10C:
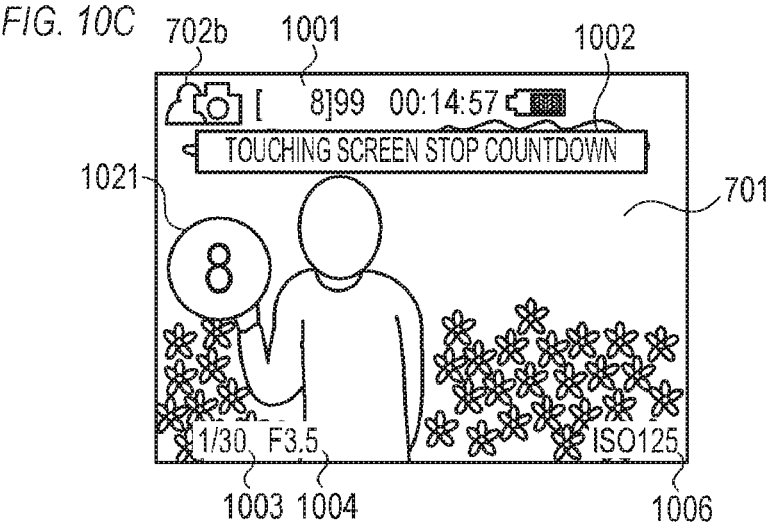

The screen during the countdown in the self-timer shooting in each operation mode is not limited to the screens indicated in FIGS. 8A to 8C. FIGS. 10A to 10C indicate another example of screens during countdown in the self-timer shooting. In FIGS. 10A to 10C, a display element the same as FIGS. 7A to 7C is denoted with the same reference sign as FIGS. 7A to 7C.

FIG. 10A is an example of the screen that is displayed during countdown in the self-timer imaging in a program mode (P mode) included in the still image shooting mode. A shooting mode icon 702a indicates that the current shooting mode is a program mode (P mode) included in the still image shooting mode. A countdown item 1001 indicates a numeric value (remaining time) which dynamically decreases as the countdown of the self-timer progresses, and FIG. 10A indicates that the remaining time until the still image shooting is performed is eight seconds. This numeric value is updated every second, and seven is displayed if the remaining time is seven seconds, and six is displayed if the remaining time is six seconds. Before the self-timer shooting is started, a remaining number of shootable images, which is a number of still images that can be recorded with a residual capacity of the recording medium 200, is displayed in the display region of the countdown item 1001. A message 1002 is a guidance to notify that the self-timer shooting can be stopped by touching the display surface of the display unit 28 (operation surface of the touch panel) during countdown. The display items 1X003, 1004, 1005 and 1X006 all indicate the current setting of shooting, and indicate the shutter speed, the aperture value, the exposure correction and the ISO sensitivity respectively.

FIG. 10B is an example of the screen that is displayed during countdown in the self-timer imaging in the moving image shooting mode. A shooting mode icon 712 indicates that the current shooting mode is the moving image shooting mode. A countdown item 1011 indicates a numeric value (remaining time) which dynamically decreases as the countdown of the self-timer progresses, and FIG. 10B indicates that the remaining time until the moving image shooting is performed is eight seconds. This numeric value is updated at each second, and seven is displayed if the remaining time is seven seconds, and six is displayed if the remaining time is six seconds. The countdown item 1011 is a circular display item, of which diameter is 20 mm, and has a display format where the numeric value in white is superimposed on the circular object filled in orange. The countdown item 1011 is displayed at a center portion of the display surface in the vertical direction, on the left side of the display surface of the display unit 28, avoiding the center of the display surface in the horizontal direction. Thereby the user can recognize with certainty the numeric value of countdown, without interrupting visibility of the major object displayed at the center of the display surface.

As illustrated in FIGS. 10A and 10B, the countdown item is displayed in a more noticeable display format in the moving image shooting mode (FIG. 10B) than the format in the still image shooting mode (FIG. 10A). Hence the user can identify whether the still image shooting or the moving image shooting will be performed by the countdown item during countdown.

The countdown item 1001 of the self-timer shooting of the still image is displayed so that visibility of the LV image 701 is not interrupted compared with the countdown item 1011 of the self-timer shooting of the moving image. This is because in the case of the self-timer shooting of the still image, the user must set the composition accurately at the shooting timing of the still image, and visibility of the LV image during countdown is more critical. For example, a typical case of using a 10 second self-timer shooting is a case of capturing a group shot including the user. In this case, all individuals, including the user, must be lined up within a shooting range without departing from this range during countdown of the self-timer, and to confirm this, the LV image must be visually recognized all the way to the left and right ends of the screen. Therefore the countdown item 1001 is not displayed at the left or right edge at the center portion of the display surface in the vertical direction, but at the upper edge, so that visibility of the LV image is not interrupted. This is not limited to the case of a group shot, but in the still image shooting, a composition confirmation is more critical in order to determine the stationary pose by the timing of the still image shooting, hence visibility of the LV image is critical. Further, in many cases, the object tends to assume a stationary pose for several seconds before the shooting, and knowing the exact timing of the start of shooting is not especially required. In the case of the self-timer shooting of a moving image, on the other hand, the objects move even after the moving image shooting starts, therefore confirming composition during self-timer shooting is not so important compared with the case of the still image. Critical here is to confirm that the object individuals are within the shooting range. Compared with a still image, in which the object maintains a pose that stops at the start of shooting, an object in a moving image must start action (e.g. moving, talking) when shooting starts. Therefore knowing the timing of the start of shooting is more important than confirming composition. Hence the countdown item 1011 is displayed large in order to stand out. For the same reason, the countdown item 811 in FIG. 8B is displayed larger than the countdown item 801 in FIG. 8A.

FIG. 10C is an example of the screen that is displayed during countdown in the self-timer imaging in the selfie mode (self-portrait mode) which is included in the still image shooting mode. The shooting mode icon 702b indicates that the current shooting mode is the selfie mode (self-portrait mode) included in the still image shooting mode. A countdown item 1021 indicates a numeric value (remaining time) which dynamically decreases as the countdown of the self-timer expires, and FIG. 10C indicates that the remaining time until the still image shooting is performed is eight seconds. This numeric value is updated at each second, and seven is displayed if the remaining time is seven seconds, and six is displayed if the remaining time is six seconds. Then a numeric value is no longer displayed when the remaining time becomes two seconds. The countdown item 1021 is a circular display item of which diameter is 18 mm, and has a display format where the numeric value in white is superimposed on the circular object filled in orange. The countdown item 1021 is displayed in a smaller size than the countdown item 1011. That is, the countdown item 1021 is displayed at a center portion of the display surface in the virtual direction, on the left side of the display surface of the display unit 28, avoiding the center of the display surface in the horizontal direction. Thereby the user can recognize with certainty the numeric value of the countdown, without interrupting the visibility of the major object displayed at the center of the display surface.

In this way, in the case of the selfie mode, the countdown item is displayed to stand out less than the case of the moving image shooting mode, but is displayed large, unlike other shooting modes included in the still image shooting mode. This is because in the selfie mode, it is assumed that the user captures an image holding a digital camera 100, and confirmation of composition need not be as strict as the case of a group shot, at least until several seconds before shooting. However, confirmation of composition, such as the user determining facial expression, becomes important several seconds (e.g. two seconds) before shooting, therefore the countdown item 1021 is not displayed during this time, so that the LV image 701 can be easily seen. Another reason why priority is assigned to the visibility of the LV image over the countdown item from several seconds before shooting is that in the still image shooting, strictly recognizing the start timing of shooting is not required so much for the moving image shooting, as mentioned above. If the setup time of the self-timer shooting is less than two seconds, then the countdown item 1021 is not displayed at all. The displayed countdown item may be deleted at a predetermined time (e.g. two seconds) before the start of shooting in the self-timer shooting of a still image, even if it is not the selfie mode. The countdown item may not be displayed when the setup time of the self-timer is a predetermined time or less. In the self-timer shooting of a moving image, on the other hand, the display of the countdown item may be continued, without being deleted, even at a predetermined time before the start of shooting, and the countdown item may be displayed even if the setup time is the predetermined time or less.

The various controls described above, based on the assumption that these controls are performed by the system control unit 50, may be performed by one hardware, or a plurality of hardware (e.g. a plurality of processors and circuits) may share the processing so as to control the entire apparatus.

Although the present invention has been described based on the preferred embodiments, the present invention is not limited to these preferred embodiments, but includes various modes not departing from the essence of the invention. Further, each of the above described embodiments is merely an example, and each embodiment may be appropriately combined.

In the above embodiments, a case of applying the invention to the digital camera 100 was described as an example, but the present invention is not limited to this example, and is applicable to any electronic apparatus that can control shooting and display. For example, the present invention can be applied to a personal computer, PDA, portable telephone terminal, portable image viewer, printer, digital photo frame, music player, game machine, electronic book reader, video player and the like. The present invention can also be applied to a TV, projector, tablet terminal, smartphone, AI speaker, home electronic equipment, on-vehicle apparatus, medical equipment and the like.

The present invention can be applied not only to an imaging apparatus main unit, but also to a controller which communicates with an imaging apparatus (including network camera) via cable or wireless communication, and remote-controls the imaging apparatus. Examples of the apparatus that remote-controls the imaging apparatus are a smartphone, tablet PC and desktop PC. By the controller notifying commands to perform various operations and settings to the imaging apparatus, based on the operations and processing performed at the controller side, the imaging apparatus can be remotely controlled. The live view image captured by the imaging apparatus may be received and displayed at the controller side via cable or wireless communication.

According to the present disclosure, the user can more easily recognize the type of shooting that will be performed during countdown of the self-timer shooting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-215002, filed on Nov. 15, 2018, which is hereby incorporated by reference herein in its entirety.

What is claimed is:

1. An electronic apparatus comprising at least one memory and at least one processor which function as:
   a control unit configured to control so that counting of a self-timer is started responding to a shooting instruction of a still image, and shooting of the still image is performed responding to expiration of the self-timer, and
   to control so that counting of a self-timer is started responding to a shooting instruction of a moving image, and recording of the moving image is started responding to expiration of the self-timer; and
   a display control unit configured to control so that an item for countdown of self-timer shooting of the still image, which is not displayed before the counting of the self-timer responding to the shooting instruction of the still image, is displayed during the counting,
   to control so that an item for countdown of self-timer shooting of a moving image, which is an item in a display format that is different from that of the item for countdown of the self-timer shooting of the still image and is not displayed before the counting of the self-timer responding to the shooting instruction of the moving image, is displayed during the counting; and
   to control so that a first item, which indicates still image shooting, is further displayed in the self-timer shooting of the still image, and a second item, which indicates moving image shooting, is further displayed in the self-timer shooting of the moving image.

2. An electronic apparatus comprising at least one memory and at least one processor which function as:
   a switching unit configured to switch a mode to one of a plurality of shooting modes including a still image shooting mode and a moving image shooting mode;
   a control unit configured to control so that counting of a self-timer is started responding to a shooting instruction in the still image shooting mode and shooting of a still image is performed responding to expiration of the self-timer, and
   to control so that counting of a self-timer is started responding to a shooting instruction in the moving image shooting mode, and recording of a moving image is started responding to expiration of the self-timer; and
   a display control unit configured to control so that an item for countdown of self-timer shooting of the still image, which is not displayed before the counting of the self-timer responding to the shooting instruction in the still image shooting mode, is displayed during the counting,
   to control so that an item for countdown of self-timer shooting of the moving image, which is an item in a display format that is different from that of the item for countdown of the self-timer shooting of the still image and is not displayed before the counting of the self-timer responding to the shooting instruction in the moving image shooting mode, is displayed during the counting, and
   to control so that a first item, which indicates still image shooting, is further displayed in the self-timer shooting of the still image, and a second item, which indicates moving image shooting, is further displayed in the self-timer shooting of the moving image.

3. An electronic apparatus comprising at least one memory and at least one processor which function as:
   a control unit configured to control so that counting of a self-timer is started responding to a shooting instruction of a still image, and shooting of the still image is performed responding to expiration of the self-timer, and
   to control so that counting of a self-timer is started responding to a shooting instruction of a moving image, and recording of the moving image is started responding to expiration of the self-timer; and a display control unit configured to control so that an item for countdown of self-timer shooting is displayed during the counting of the self-timer responding to the shooting instruction of the still image, and the item for the countdown is not displayed responding to that a remaining time of the countdown reaches a predetermined time, to control so that an item for countdown of self-timer shooting is displayed during the counting of the self-timer responding to the shooting instruction of the moving image, and the countdown by the item is continued even when a remaining time of the countdown reaches the predetermined time, and to control so that a first item, which indicates still image shooting, is further displayed in the self-timer shooting of the still image, and a second item, which indicates moving image shooting, is further displayed in the self-timer shooting of the moving image.

4. The electronic apparatus according to claim 1, wherein the display control unit controls so that the item for the countdown of the self-timer shooting of the still image is not displayed responding to that a remaining time of the countdown reaches a predetermined time, and the countdown of the self-timer shooting of the moving image by the item is continued even when a remaining time of the countdown reaches the predetermined time.

5. The electronic apparatus according to claim 1, wherein in the self-timer shooting of the moving image, the display control unit controls so that the item for the countdown is displayed in a larger size than that in the self-timer shooting of the still image.

6. The electronic apparatus according to claim 1, wherein a time of the self-timer can be set for the self-timer shooting of the still image and the self-timer shooting of the moving image independently.

7. The electronic apparatus according to claim 1, wherein sound output of the countdown of the self-timer shooting of the still image is different from that of the self-timer shooting of the moving image.

8. The electronic apparatus according to claim 7, wherein in the self-timer shooting of the moving image, a speech sound is emitted after emitting a beep sound up to the middle of the countdown, and in the self-timer shooting of the still image, a speech sound is not emitted at the end of the countdown.

9. The electronic apparatus according to claim 1, wherein the display control unit controls so that a hue of a background of the item for the countdown of the self-timer shooting of the still image is different from that of the self-timer shooting of the moving image.

10. The electronic apparatus according to claim 9, wherein the display control unit controls so that a hue of a background of the item for countdown of self-timer shooting to record both a moving image and a still image is the same as that of the self-timer shooting of the still image only.

11. The electronic apparatus according to claim 1, wherein light emission performed by a light source that is not used for display during the countdown of the self-timer shooting of the still image is different from that of the self-timer shooting of the moving image.

12. The electronic apparatus according to claim 11, wherein light emission of the light source performed during countdown of self-timer shooting which records both a moving image and a still image is the same as that of the self-timer shooting of the still image only.

13. The electronic apparatus according to claim 1, wherein the first item includes a character string which indicates the still image shooting, and the second item includes a character string which indicates the moving image shooting.

14. The electronic apparatus according to claim 1, wherein the first item includes an icon which indicates the still image shooting, and the second item includes an icon which indicates the moving image shooting.

15. The electronic apparatus according to claim 14, wherein the display control unit statically displays the icon which indicates the still image shooting, and dynamically displays the icon which indicates the moving image shooting.

16. The electronic apparatus according to claim 1, wherein in self-timer shooting to record both a moving image and a still image, the display control unit controls so that a third item, which indicates a shooting to record both the moving image and the still image or which indicates the still image shooting, is further displayed.

17. The electronic apparatus according to claim 16, wherein the third item includes a character string which indicates the shooting to record both the moving image and the still image.

18. The electronic apparatus according to claim 16, wherein the third item includes both an icon which indicates the still image shooting and an icon which indicates the moving image shooting, or includes the icon which indicates the still image shooting without including the icon which indicates the moving image shooting.

19. The electronic apparatus according to claim 1, wherein the display control unit controls so that the item for the countdown of the self-timer shooting of the still image is not displayed in a center portion of a display surface in a vertical direction, and the item for the countdown of the self-timer shooting of the moving image is displayed on the center portion.

20. The electronic apparatus according to claim 1, wherein in the self-timer shooting of the still image, the display control unit controls so that an item for countdown is displayed in a larger size in a case of the selfie mode compared with other cases.

21. A control method of an electronic apparatus, the control method comprising:

controlling so that counting of a self-timer is started responding to a shooting instruction of a still image, and shooting of the still image is performed responding to expiration of the self-timer;

controlling so that counting of a self-timer is started responding to a shooting instruction of a moving image, and recording of the moving image is started responding to expiration of the self-timer;

controlling so that an item for countdown of self-timer shooting of the still image, which is not displayed before the counting of the self-timer responding to the shooting instruction of the still image, is displayed during the counting;

controlling so that an item for countdown of self-timer shooting of a moving image, which is an item in a display format that is different from that of the item for countdown of the self-timer shooting of the still image and is not displayed before the counting of the self-timer responding to the shooting instruction of the moving image, is displayed during the counting; and controlling so that a first item, which indicates still image shooting, is further displayed in the self-timer shooting of the still image, and a second item, which indicates moving image shooting, is further displayed in the self-timer shooting of the moving image.

22. A control method of an electronic apparatus, the method comprising:

switching a mode to one of a plurality of shooting modes including a still image shooting mode and a moving image shooting mode;

controlling so that counting of a self-timer is started responding to a shooting instruction in the still image shooting mode and shooting of a still image is performed responding to expiration of the self-timer;

controlling so that counting of a self-timer is started responding to a shooting instruction in the moving image shooting mode, and recording of a moving image is started responding to expiration of the self-timer;

controlling so that an item for countdown of self-timer shooting of the still image, which is not displayed before the counting of the self-timer responding to the shooting instruction in the still image shooting mode, is displayed during the counting; and controlling so that an item for countdown of self-timer shooting of the moving image, which is an item in a display format that is different from that of the item for countdown of the self-timer shooting of the still image and is not displayed before the counting of the self-timer responding to the shooting instruction in the moving image shooting mode, is displayed during the counting; and controlling so that a first item, which indicates still image shooting, is further displayed in the self-timer shooting of the still image, and a second item, which indicates moving image shooting, is further displayed in the self-timer shooting of the moving image.

23. A control method of an electronic apparatus, the control method comprising:

controlling so that counting of a self-timer is started responding to a shooting instruction of a still image, and shooting of the still image is performed responding to expiration of the self-timer;

controlling so that counting of a self-timer is started responding to a shooting instruction of a moving image, and recording of the moving image is started responding to expiration of the self-timer;

controlling so that an item for countdown of self-timer shooting is displayed during the counting of the self-timer responding to the shooting instruction of the still image, and the item for the countdown is not displayed responding to that a remaining time of the countdown reaches a predetermined time;

controlling so that an item for countdown of self-timer shooting is displayed during the counting of the self-timer responding to the shooting instruction of the moving image, and the countdown by the item is continued even when a remaining time of the countdown reaches the predetermined time; and controlling so that a first item, which indicates still image shooting, is further displayed in the self-timer shooting of the still image, and a second item, which indicates moving image shooting, is further displayed in the self-timer shooting of the moving image.

24. A non-transitory computer readable medium that stores a program, wherein the program causes a computer to execute a control method of an electronic apparatus, the control method comprising:

controlling so that counting of a self-timer is started responding to a shooting instruction of a still image, and shooting of the still image is performed responding to expiration of the self-timer;

controlling so that counting of a self-timer is started responding to a shooting instruction of a moving image, and recording of the moving image is started responding to expiration of the self-timer;

controlling so that an item for countdown of self-timer shooting of the still image, which is not displayed before the counting of the self-timer responding to the shooting instruction of the still image, is displayed during the counting;

controlling so that an item for countdown of self-timer shooting of a moving image, which is an item in a display format that is different from that of the item for countdown of the self-timer shooting of the still image and is not displayed before the counting of the self-timer responding to the shooting instruction of the moving image, is displayed during the counting; and controlling so that a first item, which indicates still image shooting, is further displayed in the self-timer shooting of the still image, and a second item, which indicates moving image shooting, is further displayed in the self-timer shooting of the moving image.

25. A non-transitory computer readable medium that stores a program, wherein the program causes a computer to execute a control method of an electronic apparatus, the method comprising:

switching a mode to one of a plurality of shooting modes including a still image shooting mode and a moving image shooting mode;

controlling so that counting of a self-timer is started responding to a shooting instruction in the still image shooting mode and shooting of a still image is performed responding to expiration of the self-timer;

controlling so that counting of a self-timer is started responding to a shooting instruction in the moving image shooting mode, and recording of a moving image is started responding to expiration of the self-timer;

controlling so that an item for countdown of self-timer shooting of the still image, which is not displayed before the counting of the self-timer responding to the shooting instruction in the still image shooting mode, is displayed during the counting;

controlling so that an item for countdown of self-timer shooting of the moving image, which is an item in a display format that is different from that of the item for countdown of the self-timer shooting of the still image and is not displayed before the counting of the self-timer responding to the shooting instruction in the moving image shooting mode, is displayed during the counting; and controlling so that a first item, which indicates still image shooting, is further displayed in the self-timer shooting of the still image, and a second item, which indicates moving image shooting, is further displayed in the self-timer shooting of the moving image.

26. A non-transitory computer readable medium that stores a program, wherein the program causes a computer to execute a control method of an electronic apparatus, the control method comprising:

controlling so that counting of a self-timer is started responding to a shooting instruction of a still image, and shooting of the still image is performed responding to expiration of the self-timer;

controlling so that counting of a self-timer is started responding to a shooting instruction of a moving image, and recording of the moving image is started responding to expiration of the self-timer;

controlling so that an item for countdown of self-timer shooting is displayed during the counting of the self-timer responding to the shooting instruction of the still image, and the item for the countdown is not displayed responding to that a remaining time of the countdown reaches a predetermined time;

controlling so that an item for countdown of self-timer shooting is displayed during the counting of the self-timer responding to the shooting instruction of the moving image, and the countdown by the item is continued even when a remaining time of the countdown reaches the predetermined time; and controlling so that a first item, which indicates still image shooting, is further displayed in the self-timer shooting of the still image, and a second item, which indicates moving image shooting, is further displayed in the self-timer shooting of the moving image.

* * * * *